US 12,206,615 B2

(12) United States Patent
Lou et al.

(10) Patent No.: US 12,206,615 B2
(45) Date of Patent: Jan. 21, 2025

(54) COMMUNICATION METHOD, COMMUNICATIONS APPARATUS, AND DEVICE

(71) Applicant: Huawei Technologies Co., Ltd., Shenzhen (CN)

(72) Inventors: Chong Lou, Shanghai (CN); Xing Liu, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/833,133

(22) Filed: Mar. 27, 2020

(65) Prior Publication Data
US 2020/0228287 A1 Jul. 16, 2020

Related U.S. Application Data

(63) Continuation of application No. PCT/CN2018/108269, filed on Sep. 28, 2018.

(30) Foreign Application Priority Data

Sep. 28, 2017 (CN) .......................... 201710900586.0

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0621* (2013.01); *H04L 1/0003* (2013.01);
(Continued)

(58) Field of Classification Search
CPC ................. H04L 5/0053; H04L 1/0003; H04L 1/0026; H04L 5/0098; H04L 5/0005;
(Continued)

(56) References Cited

U.S. PATENT DOCUMENTS

2012/0020230 A1* 1/2012 Chen ..................... H04W 24/08
370/252
2013/0039202 A1 2/2013 Feuersanger et al.
(Continued)

FOREIGN PATENT DOCUMENTS

CN 102088433 A 6/2011
CN 105451341 A 3/2016
(Continued)

OTHER PUBLICATIONS

"Coreset Monitoring Under Dynamic Change of BWP," 3GPP TSG RAN WG1 NR Ad-Hoc #2, Qingdao, China, R1-1710872, pp. 1-5, 3rd Generation Partnership Project, Valbonne, France (Jun. 27-30, 2017).

(Continued)

*Primary Examiner* — Ajit Patel
*Assistant Examiner* — Wilfred Thomas
(74) *Attorney, Agent, or Firm* — Leydig, Voit & Mayer, Ltd.

(57) ABSTRACT

A communication method, a communications apparatus, and a device are described. The communication operation carried out by a terminal includes receiving BWP indication information sent by a network device. The BWP indication information instructs the terminal to activate a BWP and/or deactivate a BWP. The communication operation further includes sending BWP feedback information to the base station. The BWP feedback information indicates that the terminal successfully received the BWP indication information. In this way, in the event of a data transmission failure because the UE cannot receive or cannot correctly parse the BWP indication information, the UE and the base station communicating by using different BWPs can be avoided, thereby improving communication quality.

11 Claims, 11 Drawing Sheets

(51) Int. Cl.
  *H04L 1/00* (2006.01)
  *H04W 72/0453* (2023.01)
  *H04W 72/12* (2023.01)
(52) U.S. Cl.
  CPC .......... *H04L 1/0026* (2013.01); *H04L 5/0098* (2013.01); *H04W 72/0453* (2013.01); *H04W 72/12* (2013.01)
(58) Field of Classification Search
  CPC ................. H04L 1/1822; H04L 5/0055; H04L 5/0057; H04L 5/0008; H04L 1/1607; H04L 1/1812; H04B 7/0621; H04W 72/0453; H04W 72/1205; H04W 72/042; H04W 52/0248; H04W 52/365; H04W 72/0406; H04W 28/18
  See application file for complete search history.

(56) References Cited

U.S. PATENT DOCUMENTS

| | | | |
|---|---|---|---|
| 2013/0182672 A1* | 7/2013 | Kakishima | H04L 25/03949 370/329 |
| 2014/0036859 A1* | 2/2014 | Ekpenyong | H04W 72/542 370/330 |
| 2015/0181590 A1* | 6/2015 | Park | H04L 1/1822 370/280 |
| 2015/0341097 A1* | 11/2015 | Yang | H04B 7/0639 370/329 |
| 2016/0262099 A1* | 9/2016 | Park | H04W 52/0212 |
| 2018/0092122 A1* | 3/2018 | Babaei | H04W 72/042 |
| 2019/0029006 A1* | 1/2019 | Wang | H04W 4/40 |
| 2019/0053235 A1* | 2/2019 | Novlan | H04L 5/001 |
| 2019/0150187 A1* | 5/2019 | Park | H04W 72/14 370/330 |
| 2020/0112976 A1* | 4/2020 | Lin | H04W 72/042 |
| 2020/0213065 A1* | 7/2020 | Takeda | H04L 5/0092 |
| 2020/0228287 A1* | 7/2020 | Lou | H04L 1/0026 |
| 2020/0252180 A1* | 8/2020 | Takeda | H04W 72/04 |
| 2020/0305138 A1* | 9/2020 | Li | H04W 72/23 |
| 2020/0367243 A1* | 11/2020 | Zhang | H04W 24/10 |
| 2020/0374086 A1* | 11/2020 | Tang | H04L 5/0055 |
| 2020/0404685 A1* | 12/2020 | Lin | H04W 72/535 |
| 2021/0050969 A1* | 2/2021 | Chou | H04W 72/23 |
| 2021/0120537 A1* | 4/2021 | Lei | H04L 5/0053 |
| 2021/0168836 A1* | 6/2021 | Takeda | H04L 1/1835 |

FOREIGN PATENT DOCUMENTS

| | | |
|---|---|---|
| CN | 106100713 A | 11/2016 |
| EP | 3563489 A1 | 11/2019 |
| EP | 3603273 A1 | 2/2020 |
| RU | 2559047 C2 | 8/2015 |
| WO | WO2010111858 A1 * | 10/2010 |
| WO | 2017047404 A1 | 3/2017 |
| WO | 2018121621 A1 | 7/2018 |
| WO | 2018184435 A1 | 10/2018 |

OTHER PUBLICATIONS

"Wider Bandwidth Operations," 3GPP TSG RAN WG1 NR Meeting #90, Prague, Czech Republic, R1-1713654, pp. 1-9, 3rd Generation Partnership Project, Valbonne, France (Aug. 21-26, 2017).
"3rd Generation Partnership Project; Technical Specification Group Radio Access Network; NR; Physical channels and modulation (Release 15)," 3GPP TS 38.211 V1.0.0, pp. 1-37, 3rd Generation Partnership Project, Valbonne, France (Sep. 2017).
"Bandwidth part configuration and frequency resource allocation," 3GPP TSG RAN WG1 NR Ad-Hoc #2, Qingdao, China, R1-1710164, pp. 1-6, 3rd Generation Partnership Project, Valbonne, France (Jun. 27-30, 2017).
"3rd Generation Partnership Project; Technical Specification Group Radio Access Network; NR; Physical layer procedures for control (Release 15)," 3GPP TS 38.213 V0.1.0, pp. 1-13, 3rd Generation Partnership Project, Valbonne, France (Aug. 2017).
"3rd Generation Partnership Project; Technical Specification Group Radio Access Network; NR; Physical layer procedures for data (Release 15)," 3GPP TS 38.214 V1.0.0, pp. 1-32, 3rd Generation Partnership Project, Valbonne, France (Sep. 2017).
"3rd Generation Partnership Project; Technical Specification Group Radio Access Network; NR; Medium Access Control (MAC) protocol specification (Release 15)," 3GPP TS 38,321 V1.0.0, pp. 1-46, 3rd Generation Partnership Project, Valbonne, France (Sep. 2017).
"Efficient Wider Bandwidth Operations for NR," 3GPP TSG RAN WG1 Meeting #88bis, Spokane, USA, R1-1704445, pp. 1-10, 3rd Generation Partnership Project, Valbonne, France (Apr. 13-17,I 2017).
"Way Forward on bandwidth part for efficient wideband operation in NR," 3GPP TSG-RAN WG1 #89, Hangzhou, China, R1-17xxxxx (R1-1709802), pp. 1-2, 3rd Generation Partnership Project, Valbonne, France (May 15-19, 2017).
"Overview of bandwidth part," 3GPP TSG RAN WG1 Meeting #90, Prague, Czech Republic, R1-1712153, pp. 1-8, 3rd Generation Partnership Project, Valbonne, France (Aug. 21-25, 2017).
"3rd Generation Partnership Project; Technical Specification Group Radio Access Network; NR; Radio Resource Control (RRC); Protocol specification (Release 15)," 3GPP TS 38.331 V0.0.5, R2-1708468, pp. 1-38, 3rd Generation Partnership Project, Valbonne, France (Aug. 2017).
"3rd Generation Partnership Project; Technical Specification Group Radio Access Network; NR; Packet Data Convergence Protocol (PDCP) specification (Release 15)," 3GPP TS 38.323 V0.3.0, R2-1709753, pp. 1-28, 3rd Generation Partnership Project, Valbonne, France (Aug. 2017).
Guangdong OPPO Mobile Telecom, "Remaining issues on bandwidth part configuration and activation," 3GPP TSG RAN WG1 Meeting NR#3, Nagoya, Japan, R1-1715692, total 4 pages, 3rd Generation Partnership Project, Valbonne, France (Sep. 18-21, 2017).
Guangdong OPPO Mobile Telecom, Remaining issues on bandwidth part configuration and activation, 3GPP TSG RAN WG1 Meeting #90, Prague, Czech Republic, R1-1713266, total 6 pages, 3rd Generation Partnership Project, Valbonne, France (Aug. 21-25, 2017).
Huawei, HiSilicon, "On multiple resource configuration for UL grant-free transmission," 3GPP TSG RAN WG1 NR Ad-Hoc #3, Nagoya, Japan, R1-1715420, total 6 pages, 3rd Generation Partnership Project, Valbonne, France (Sep. 18-21, 2017).
InterDigital, "SPS and Grant-free operation for NR," 3GPP TSG-RAN WG2 #NR Adhoc#2, Qingdao, China, R2-1706687, total 3 pages, 3rd Generation Partnership Project, Valbonne, France (Jun. 27-29, 2017).
Ericsson, "On UL SPS transmission," 3GPP TSG-RAN WG1 Meeting #89, R1-1709098, total 4 pages, 3rd Generation Partnership Project, Valbonne, France (May 15-19, 2017).
Samsung, "RAN2 consideration for bandwidth part in NR," 3GPP TSG-RAN WG2 NR Ad-hoc#2 Meeting, R2-1706427, total 5 pages, 3rd Generation Partnership Project, Valbonne, France (Jun. 27-29, 2017).

* cited by examiner

COMMUNICATION METHOD, COMMUNICATIONS APPARATUS, AND DEVICE

CROSS-REFERENCE TO RELATED APPLICATIONS

This application is a continuation of International Application No. PCT/CN2018/108269, filed on Sep. 28, 2018, which claims priority to Chinese Patent Application No. 201710900586.0, filed on Sep. 28, 2017. The disclosures of the aforementioned applications are hereby incorporated by reference in their entireties.

TECHNICAL FIELD

Embodiments of this application relate to the communications field, and in particular, to a communication method, a communications apparatus, and a device.

BACKGROUND

In a new-generation wireless communications system (New Radio, NR), a concept of bandwidth part (BWP) is introduced. A band of a cell may be divided into a plurality of subbands. The subbands may overlap. Each subband has a corresponding air interface format, and each subband may further have uplink and downlink control channels and data channels. Such subband is referred to as a BWP in NR.

Each cell has an initially activated BWP. A base station may notify user equipment (UE) of the initially activated BWP by using broadcast information, system information, or the like. After the UE initially accesses a cell by using the initially activated BWP, different BWPs may be configured for the UE. For example, the cell has a BWP 1 and a BWP 2, and all UEs may access the cell by using the BWP 1. However, after a UE successfully access the cell, the base station configures the BWP 2 for some UEs to send and receive data.

The base station may configure a plurality of BWPs for each UE. For example, after the UE accesses the cell having the BWP 1 and the BWP 2 by using the BWP 1, the base station may configure both the BWP 1 and the BWP 2 for the UE. Although a plurality of BWPs may be simultaneously configured for each UE, the base station selectively activates some or all of the BWPs. For example, after the UE accesses the cell having the BWP 1 and the BWP 2 by using the BWP 1, the base station configures both the BWP 1 and the BWP 2 for the UE, but activates only the BWP 2, and does not activate the BWP 1, and the UE can receive and send data only on the BWP 2. When the base station detects a change of a service of the UE, the base station may further activate the BWP 1, and maintain the BWP 2, and the UE may receive and send data on both the BWP 1 and the BWP 2. Alternatively, the base station activates the BWP 1, but deactivates the BWP 2, and the UE can receive and send data only on the BWP 1. In other words, the UE can receive and send data only on an activated BWP, and the UE stores only configuration information of another BWP that is not activated.

However, during BWP activation, deactivation or switching, how to improve communication quality becomes a problem that needs to be urgently resolved.

SUMMARY

In view of this, embodiments of this application provide a communication method, a communications apparatus, and a device, to resolve a prior-art problem of low communication quality during BWP activation, deactivation, or switching.

According to a first aspect, an embodiment of this application provides a communication method, including: receiving, by a terminal, BWP indication information that is sent by a network device and that is used to instruct the terminal to activate a BWP and/or deactivate a BWP; and sending, to the network device, BWP feedback information used to indicate that the terminal successfully receives the BWP indication information.

The BWP indication information may be a control indication, for example, a DCI indication, sent by the network device through a control channel, or may be another indication sent by the network device through another type of channel. The BWP indication information may include a BWP identifier used to instruct to activate or deactivate a BWP corresponding to the identifier.

The BWP feedback information may be included in a MAC message, or may be another type of message.

In the communication method provided in this embodiment, the network device sends, to the terminal, the BWP indication information used to instruct the terminal to activate a BWP and/or deactivate a BWP, and after successfully receiving the BWP indication information, the terminal sends the BWP feedback information to the base station, to notify the base station that the BWP indication information is successfully received. In this way, a data transmission failure that is caused because when the terminal cannot receive or cannot correctly parse the BWP indication information, the terminal and the base station communicate by using different BWPs can be avoided, thereby improving data transmission quality.

Optionally, the BWP feedback information is included in a media access control MAC layer message.

Optionally, the MAC layer message includes a MAC subheader or includes a MAC subheader and a MAC payload, the MAC subheader includes a logical channel identifier (LCID), and the LCID is used to indicate that the terminal successfully receives the BWP indication information.

In this embodiment, the BWP feedback information is included in a MAC layer message, and the MAC subheader includes the LCID used to indicate that the terminal successfully receives the BWP indication information. When the BWP indication information is a control indication sent by the base station through the control channel, the UE may generate the BWP feedback information at a MAC layer, to notify the base station that the BWP indication information is successfully received, to ensure transmission reliability of the BWP indication information.

Optionally, the MAC payload includes an identifier of the activated BWP or an identifier of the deactivated BWP, so that the network device and the base station can transmit data on a same BWP, to ensure data transmission reliability.

Optionally, the MAC payload further includes a carrier component identifier, and the carrier component identifier is used to indicate a carrier on which the activated BWP is located or a carrier on which the deactivated BWP is located.

In this embodiment, the MAC payload includes the carrier component identifier, so that the base station and the UE can transmit data on a same carrier, to ensure data transmission reliability.

Optionally, the sending, by the terminal, BWP feedback information to a base station includes: sending, by the terminal, the BWP feedback information on the activated BWP; or sending, by the terminal, the BWP feedback information on the deactivated BWP: or sending, by the terminal, the BWP feedback information on a second carrier component, where the activated BWP or the deactivated BWP is a frequency resource on a first carrier component.

In this embodiment, the BWP feedback information may be sent on different frequency resources in a plurality of flexible and changeable manners, to ensure transmission reliability of the BWP feedback information.

Optionally, when the BWP indication information is used to instruct the terminal to activate a BWP, the method further includes: activating a transmission resource on the BWP that the network device instructs to activate.

The transmission resource may include a semi-persistent scheduling (SPS) resource, a channel state information (CSI) resource, a schedule request (SR) resource, or the like.

In this embodiment, when the BWP indication information is used to instruct the terminal to activate a BWP, the UE automatically activates an SPS resource on the BWP that needs to be activated, and the base station does not need to instruct, by using signaling on a physical downlink control channel (PDCCH), to activate the SPS resource. Therefore, the signaling can be saved.

Optionally, when the BWP indication information is used to instruct the terminal to deactivate a BWP, the method further includes: releasing a transmission resource on the BWP that the network device instructs to deactivate.

In this embodiment, when the BWP indication information is used to instruct the terminal to deactivate a BWP, the UE automatically releases an SPS resource on the BWP that needs to be deactivated, and the base station does not need to instruct, by using signaling on a PDCCH, to release the SPS resource. Therefore, the signaling can be saved.

Optionally, when the BWP indication information is used to instruct the terminal to activate a BWP, the method further includes: initializing a hybrid automatic repeat request (HARQ) process for the activated BWP.

In this embodiment, when the BWP indication information is used to instruct the terminal to activate a BWP, the UE automatically initializes the HARQ process for the activated BWP, and the base station does not need to configure a HARQ process by using signaling on a PDCCH. Therefore, the signaling can be saved.

According to a second aspect, an embodiment provides a communication method, including: receiving, by a terminal, a BWP configuration message that is sent by a network device and that is used to configure an SPS resource of a BWP; receiving first BWP indication information that is sent by the network device and that is used to instruct the terminal to activate a first BWP; and activating, by the terminal, an SPS resource on the first BWP.

The BWP configuration message may be an RRC message. The RRC message may be system information that is not limited to minimum system information (minimum SI) and/or remaining system information. Alternatively, the RRC message may be a UE-specific RRC message.

The SPS resource may include an uplink/downlink SPS transmission resource time interval or period, a frequency domain location of an SPS transmission resource, a modulation and coding scheme, or the like.

In the communication method provided in this embodiment, the network device sends, to the terminal, the BWP configuration message used to configure an SPS resource of a BWP, and after receiving the first BWP indication information sent by the network device, the terminal automatically activates the SPS resource on the first BWP, and a base station does not need to send a separate indication used to activate an SPS resource. Therefore, signaling overheads are reduced.

Optionally, the method further includes: releasing, by the terminal, the SPS resource on the first BWP after receiving second BWP indication information that is sent by the network device and that is used to instruct the terminal to deactivate the first BWP.

In this embodiment, the network device sends, to the terminal, the second BWP indication information used to instruct the terminal to deactivate the first BWP, and after receiving the second BWP indication information, the terminal automatically releases the SPS resource on the first BWP, and the base station does not need to send a separate indication used to release an SPS resource. Therefore, signaling overheads are reduced.

Optionally, the second BWP indication information is further used to instruct the terminal to activate a second BWP, and the method further includes: determining, by the terminal, an SPS resource on the second BWP based on information about the second BWP and the SPS resource on the first BWP. The base station does not need to indicate information about the SPS resource on the second BWP by using separate signaling. Therefore, signaling overheads are reduced.

Optionally, an offset between a physical resource block PRB number of a start location of the SPS resource on the second BWP and a physical resource block (PRB) number of a start resource location of the second BWP is the same as an offset between a PRB number of a start location of the SPS resource on the first BWP and a PRB number of a start resource location of the first BWP; and an absolute time of a period of the SPS resource on the second BWP is the same as an absolute time of a period of the SPS resource on the first BWP.

In this embodiment, the SPS resource on the second BWP may be determined by using different methods, and the base station does not need to indicate the information about the SPS resource on the second BWP by using separate signaling. Therefore, signaling overheads are reduced. In addition, the method is flexible and changeable, and may be applied to different scenarios.

According to a third aspect, an embodiment of this application provides a communication method, including: receiving, by a terminal, a BWP configuration message that is sent by a network device and that is used to indicate duration of a timer: starting, by the terminal, the timer when receiving a BWP indication information used to instruct the terminal to activate a BWP or deactivate a BWP; and reporting, by the terminal, a power headroom report when the timer expires and a power headroom reporting condition is satisfied.

The BWP configuration message may include configuration information of one or more BWPs, and the BWP configuration message may include at least one of a BWP identifier, a BWP time domain resource, and a BWP frequency domain resource.

The timer is a BWP prohibit timer configured by a base station, and duration of the BWP prohibit timer may be carried in an RRC message sent by the base station to UE.

In the communication method provided in this embodiment of this application, the network device sends, to the terminal, the configuration message used to indicate duration of a timer, the terminal starts the timer when receiving the BWP indication information sent by the base station, and the terminal reports the power headroom report when the timer expires and the power headroom reporting condition is satisfied. Therefore, a quantity of times of reporting the PHR can be reduced, and a transmission resource can be saved.

Optionally, the power headroom reporting condition includes that the terminal receives another BWP indication information.

According to a fourth aspect, an embodiment of this application provides a communication method, including: receiving, by a terminal, BWP indication information that is sent by a network device and that is used to instruct the terminal to activate a BWP and/or deactivate a BWP; and processing a HARQ process on the activated BWP or the deactivated BWP.

In the communication method provided in this embodiment, when the network device instructs the terminal to activate or deactivate a BWP, the terminal automatically processes a HARQ process on the activated BWP or the deactivated BWP, and a base station does not need to configure a HARQ process by using a separate control indication. Therefore, signaling is saved, and data retransmission continuity can be ensured, thereby improving communication quality.

Optionally, if the BWP indication information is used to instruct to activate a first BWP, the terminal initializes a HARQ process for the activated first BWP.

In this embodiment, when a BWP 1 and a BWP 2 of UE simultaneously work, the UE initializes another set of HARQ processes for the BWP 2, and a HARQ process of the BWP 1 remains unchanged. In this case, a HARQ buffer of the HARQ process of the BWP 1 does not need to be emptied, to ensure data transmission continuity.

Optionally, if the BWP indication information is used to instruct to deactivate a first BWP and activate a second BWP, a HARQ process of the first BWP is associated with the second BWP.

In this embodiment, when the base station instructs UE to deactivate an originally activated BWP 1 and activate a BWP 2, a set of HARQ processes of the BWP 1 are directly associated with the BWP 2. The UE and the base station continue to perform transmission on the BWP 2 by directly using an original HARQ ID of the BWP 1, and the base station does not need to configure a HARQ process for the BWP 2 by using a new indication. Therefore, overheads are reduced. In addition, a HARQ buffer of the HARQ process of the BWP 1 does not need to be emptied, to ensure data transmission continuity, to ensure data transmission continuity.

Optionally, if the BWP indication information is used to instruct to deactivate a first BWP and activate a second BWP, a HARQ process is initialized for the second BWP, and a HARQ process of the first BWP is associated with the initialized HARQ process of the second BWP based on indication signaling.

The indication signaling is used to indicate an association relationship between a HARQ process of the first BWP and an initialized HARQ process of the second BWP. The indication signaling may be a separate DCI indication, or may be carried in the BWP indication information.

In this embodiment, another set of HARQ processes are initialized for the BWP 2, and both data buffered in each HARQ process of the BWP 1 and a variable of each HARQ process are copied into a HARQ buffer of the BWP 2. A HARQ buffer of the HARQ process of the BWP 1 does not need to be emptied, to ensure data transmission continuity.

Optionally, if the BWP indication information is used to instruct to activate a second BWP, the terminal determines whether a first BWP has a HARQ process in which data is being retransmitted. If the first BWP has a HARQ process in which data is being retransmitted, the terminal monitors the first BWP; and activates the second BWP after data retransmission ends.

In this embodiment, if the base station instructs UE to migrate from a BWP 1 to a BWP 2, if a HARQ process, of the BWP 1, in which retransmission is already performed still continues, the base station no longer schedules new transmission. The BWP 2 becomes valid after data retransmission on the BWP 1 ends. A MAC layer needs to notify a physical layer (PHY) of a validity moment of the BWP 2. In the method, continuity of retransmitted data can be ensured. In addition, the base station does not need to schedule retransmission again. Therefore, signaling and a transmission resource are saved.

According to a fifth aspect, an embodiment of this application provides a communication method, including: receiving, by a terminal, a BWP configuration message that is sent by a network device and that is used to configure a CSI resource and/or an SRS resource of a BWP: receiving first BWP indication information that is sent by the network device and that is used to instruct the terminal to activate a first BWP; and activating a CSI resource and/or an SRS resource on the first BWP.

The BWP configuration message may be an RRC message, or may be physical layer signaling. A BWP configuration message used to configure a CSI resource of a BWP and a BWP configuration message used to configure an SRS resource of a BWP may be a same message, or may be different messages, and are respectively used to configure a CSI resource of a BWP and an SRS resource of a BWP.

In the communication method provided in this embodiment, the network device sends, to the terminal, the BWP configuration message used to configure a CSI resource and/or an SRS resource of a BWP, and after receiving the first BWP indication information sent by the network device, the terminal automatically activates the CSI resource and/or the SRS resource on the first BWP, and a base station does not need to send a separate instruction used to activate a CSI resource and/or an SRS resource. Therefore, signaling overheads are reduced.

Optionally, the terminal receives second BWP indication information that is sent by the network device and that is used to instruct the terminal to deactivate the first BWP, and releases the CSI resource and/or the SRS resource on the first BWP.

In this embodiment, after receiving the second BWP indication information that is sent by the base station and that is used to instruct the terminal to deactivate the first BWP, the terminal considers that the CSI resource and/or the SRS resource on the first BWP are/is invalid. In this case, the terminal automatically releases the CSI resource and/or the SRS resource on the first BWP, and the base station does not need to send separate signaling used to instruct to release a CSI resource and/or an SRS resource. Therefore, the signaling is saved.

Optionally, the terminal receives second BWP indication information that is sent by the network device and that is used to instruct the terminal to deactivate the first BWP and activate a second BWP, releases the CSI resource and/or the SRS resource on the first BWP, and starts to use a CSI resource and/or an SRS resource on the second BWP.

In this embodiment, after receiving the second BWP indication information sent by the base station, the terminal considers that the CSI resource and/or the SRS resource on the first BWP are/is invalid. In this case, the terminal automatically releases the CSI resource and/or the SRS resource on the first BWP, and starts to use the CSI resource and/or the SRS resource on the second BWP, and the base station does not need to send separate signaling used to instruct to release and start to use a CSI resource and/or an SRS resource. Therefore, the signaling is saved.

According to a sixth aspect, an embodiment of this application provides a communication method, including: receiving, by a terminal, BWP indication information that is sent by a network device and that is used to instruct the terminal to activate a BWP and/or deactivate a BWP; and processing an SR_COUNTER on the activated BWP or the deactivated BWP.

In this embodiment, after receiving the BWP indication information, a physical layer instructs a MAC layer to perform initialization or stop using an SR_COUNTER configured for a current SR and start to use an SR_COUNTER configured for a new SR, and the network device does not need to indicate, by using separate signaling, an SR_COUNTER configured for an SR. Therefore, the signaling is saved.

According to a seventh aspect, an embodiment of this application provides a communication method, including: sending, by a network device, BWP indication information to a terminal, and receiving, by the network device, BWP feedback information sent by the terminal, where the BWP indication information is used to instruct the terminal to activate a BWP and/or deactivate a BWP, and the BWP feedback information is used to indicate that the terminal successfully receives the BWP indication information.

Optionally, the BWP feedback information is included in a media access control (MAC) layer message.

Optionally, the MAC layer message includes a MAC subheader or includes a MAC subheader and a MAC payload, the MAC subheader includes a logical channel identifier (LCID), and the LCID is used to indicate that the terminal successfully receives the BWP indication information.

Optionally, the MAC payload includes an identifier of the activated BWP or an identifier of the deactivated BWP.

Optionally, the MAC payload further includes a carrier component identifier, and the carrier component identifier is used to indicate a carrier on which the activated BWP is located or a carrier on which the deactivated BWP is located.

Optionally, the receiving, by the network device, BWP feedback information sent by the terminal includes: receiving, by the network device, the BWP feedback information on the activated BWP: or receiving, by the network device, the BWP feedback information on the deactivated BWP: or receiving, by the network device, the BWP feedback information on a second carrier component, where the activated BWP or the deactivated BWP is a frequency resource on a first carrier component.

In the communication method provided in this embodiment, for an implementation principle and beneficial effects thereof, refer to the description of the first aspect. Details are not described herein again.

According to an eighth aspect, an embodiment of this application provides a communication method, including: sending, by a network device, a BWP configuration message to a terminal; and sending first BWP indication information to the terminal, where the configuration message is used to configure a semi-persistent scheduling (SPS) resource of a BWP, and the first BWP indication information is used to instruct the terminal to activate a first BWP.

Optionally, the method further includes: sending, by the network device, second BWP indication information to the terminal, where the second BWP indication information is used to instruct the terminal to deactivate the first BWP.

Optionally, the second BWP indication information is further used to instruct the terminal to activate a second BWP.

Optionally, an offset between a physical resource block PRB number of a start location of an SPS resource on the second BWP and a physical resource block (PRB) number of a start resource location of the second BWP is the same as an offset between a PRB number of a start location of an SPS resource on the first BWP and a PRB number of a start resource location of the first BWP; and an absolute time of a period of the SPS resource on the second BWP is the same as an absolute time of a period of the SPS resource on the first BWP.

In the communication method provided in this embodiment, for an implementation principle and beneficial effects thereof, refer to the description of the second aspect. Details are not described herein again.

According to a ninth aspect, an embodiment of this application provides a communication method, including: sending, by a network device to a terminal, a BWP configuration message used to indicate duration of a timer: sending, to the terminal, BWP indication information used to instruct the terminal to activate a BWP or deactivate a BWP, so that the terminal starts the timer; and receiving a power headroom report reported by the terminal, where the power headroom report is a report sent by the terminal when the timer expires and a power headroom reporting condition is satisfied.

Optionally, the power headroom reporting condition includes that the terminal receives another BWP indication information.

In the communication method provided in this embodiment, for an implementation principle and beneficial effects thereof, refer to the description of the third aspect. Details are not described herein again.

According to a tenth aspect, an embodiment of this application provides a communication method, including: sending, by a network device to a terminal, BWP indication information used to instruct the terminal to activate a BWP and/or deactivate a BWP, so that the terminal processes a HARQ process on the activated BWP or the deactivated BWP after receiving the BWP indication information.

Optionally, if the BWP indication information sent by the network device is used to instruct to activate a first BWP, the terminal initializes a HARQ process for the activated first BWP.

Optionally, if the BWP indication information sent by the network device is used to instruct to deactivate a first BWP and activate a second BWP, the terminal associates a HARQ process of the first BWP with the second BWP.

Optionally, if the BWP indication information sent by the network device is used to instruct to deactivate a first BWP and activate a second BWP, the terminal initializes a HARQ process for the second BWP, and associates a HARQ process of the first BWP with the initialized HARQ process of the second BWP based on instruction signaling.

Optionally, if the BWP indication information sent by the network device is used to instruct to activate a second BWP, the terminal determines whether a first BWP has a HARQ process in which data is being retransmitted. If the first BWP has a HARQ process in which data is being retransmitted, the terminal monitors the first BWP; and activates the second BWP after data retransmission ends.

In the communication method provided in this embodiment, for an implementation principle and beneficial effects thereof, refer to the description of the fourth aspect. Details are not described herein again.

According to an eleventh aspect, an embodiment of this application provides a communication method, including: sending, by a network device to a terminal, a BWP configuration message used to configure a CSI resource and/or an SRS resource of a BWP; and sending, to the terminal, first BWP indication information used to instruct the terminal to activate a first BWP, so that the terminal activates a CSI resource and/or an SRS resource on the first BWP.

Optionally, second BWP indication information sent by the network device is used to instruct the terminal to deactivate the first BWP, so that the terminal releases the CSI resource and/or the SRS resource on the first BWP after receiving the second BWP indication information.

Optionally, the network device sends, to the terminal, second BWP indication information used to instruct the terminal to deactivate the first BWP and activate a second BWP, so that after receiving the BWP indication information, the terminal releases the CSI resource and/or the SRS resource on the first BWP, and starts to use a CSI resource and/or an SRS resource on the second BWP.

In the communication method provided in this embodiment, for an implementation principle and beneficial effects thereof, refer to the description of the fifth aspect. Details are not described herein again.

According to a twelfth aspect, an embodiment of this application provides a communication method, including: sending, by a network device to a terminal, BWP indication information used to instruct the terminal to activate a BWP and/or deactivate a BWP, so that the terminal processes an SR_COUNTER on the activated BWP or the deactivated BWP after receiving the BWP indication information.

In the communication method provided in this embodiment, for an implementation principle and beneficial effects thereof, refer to the description of the sixth aspect. Details are not described herein again.

According to a thirteenth aspect, an embodiment of this application provides a communications apparatus, including units or means configured to perform the steps in any one of the embodiments in the first aspect to the twelfth aspect.

According to a fourteenth aspect, an embodiment of this application provides a communication apparatus, including a processor and a memory. The memory is configured to store a program. When being invoked by the processor, the program is used to perform the method in any one of the embodiments in the first aspect to the twelfth aspect.

According to a fifteenth aspect, an embodiment of this application provides a computer storage medium. The computer storage medium stores a program. When being invoked by a processor, the program is used to perform the method in any one of the embodiments in the first aspect to the twelfth aspect.

According to a sixteenth aspect, an embodiment of this application provides a computer program. When being executed by a processor, the program is used to perform the method in any one of the embodiments in the first aspect to the twelfth aspect.

According to a seventeenth aspect, an embodiment of this application provides a program product, for example, a computer readable storage medium, including a program corresponding to the method in any one of the embodiments in the first aspect to the twelfth aspect.

In the first aspect or the seventh aspect, the network device sends, to the UE, the BWP indication information used to instruct the terminal to activate a BWP and/or deactivate a BWP, and after successfully receiving the BWP indication information, the UE sends the BWP feedback information to the base station, to notify the base station that the BWP indication information is successfully received. In this way, a data transmission failure that is caused because when the UE cannot receive or cannot correctly parse the BWP indication information, the UE and the base station communicate by using different BWPs can be avoided, thereby improving data transmission quality.

In the second aspect or the eighth aspect, the network device sends, to the terminal, the BWP configuration message used to configure an SPS resource of a BWP, and after receiving the first BWP indication information sent by the network device, the terminal automatically activates the SPS resource on the first BWP, and the base station does not need to send a separate indication used to activate an SPS resource. Therefore, signaling overheads are reduced.

In the third aspect or the ninth aspect, the network device sends, to the terminal, the configuration message used to indicate duration of a timer, the terminal starts the timer when receiving the BWP indication information sent by the base station, and the terminal reports the power headroom report when the timer expires and the power headroom reporting condition is satisfied. Therefore, a quantity of times of reporting the PHR can be reduced, and a transmission resource is saved.

In the fourth aspect or the tenth aspect, when the network device instructs the terminal to activate or deactivate a BWP, the terminal automatically processes a HARQ process on the activated BWP or the deactivated BWP, and the base station does not need to configure a HARQ process by using a separate control indication. Therefore, signaling is saved, and data retransmission continuity can be ensured, thereby improving communication quality.

In the fifth aspect or the eleventh aspect, the network device sends, to the terminal, the BWP configuration message used to configure a CSI resource and/or an SRS resource of a BWP, and after receiving the first BWP indication information sent by the network device, the terminal automatically activates the CSI resource and/or the SRS resource on the first BWP, and the base station does not need to send a separate indication used to activate a CSI resource and/or an SRS resource. Therefore, signaling overheads are reduced.

In the sixth aspect or the twelfth aspect, after receiving the BWP indication information, the physical layer instructs the MAC layer to perform initialization or stop using the SR_COUNTER configured for the current SR and start to use the SR_COUNTER configured for the new SR, and the network device does not need to indicate, by using separate signaling, an SR_COUNTER configured for an SR. Therefore, the signaling is saved.

DESCRIPTION OF EMBODIMENTS

Figure 1:
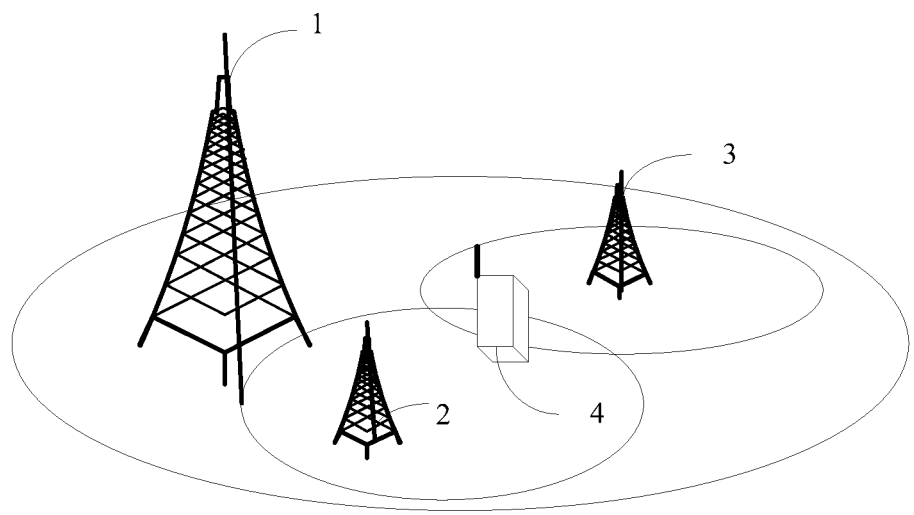
FIG. 1 is a schematic diagram of an application scenario of a communication method according to an embodiment of this application.

The following describes some terms in the embodiments of this application to facilitate understanding.

(1). A terminal is also referred to as user equipment (UE), a mobile station (MS), a mobile terminal (MT), or the like, and is a device that provides a user with voice/data connectivity, for example, a handheld device or an in-vehicle device with a wireless connection function. Currently, for example, the terminal is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

(2). A network device is a device, for example, a radio access network (RAN) node, that provides a wireless service for a terminal. The RAN node is a node that is in a network and that enables a terminal to access a radio network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, home evolved NodeB or home Node B, HNB), a baseband unit (BBU), or a Wifi access point (AP). In addition, in a network structure, a RAN includes a centralized unit (CU) node or a distributed unit (DU) node. In this structure, functions on a RAN side are allocated to a CU and a DU for implementation, and a plurality of DUs are under centralized control of one CU. In this case, the RAN node may be the CU node/DU node. Functions of the CU and the DU may be obtained through division of radio network protocol layers. For example, a function of a packet data convergence protocol (PDCP) layer is provided on the CU, and functions of protocol layers, for example, a radio link control (RLC) layer and a media access control (MAC) layer, below the PDCP are provided on the DU. This protocol layer division is merely an example. Alternatively, division may be performed based on another protocol layer. For example, division is performed based on an RLC layer, functions of the RLC layer and a protocol layer above the RLC layer are provided on the CU, and a function of a protocol layer below the RLC layer is provided on the DU. Alternatively, division is performed on a specific protocol layer. For example, some functions of the RLC layer and a function of a protocol layer above the RLC layer are provided on the CU, and remaining functions of the RLC layer and a function of a protocol layer below the RLC layer are provided on the DU. In addition, division may be performed in another manner. For example, division is performed based on a latency, a function that needs to satisfy a latency requirement is provided on the DU, and a function whose latency requirement is lower than the latency requirement is provided on the CU.

(3). "A plurality of" means two or more, and another quantifier is similar to this. The character "/" describes an association relationship for describing associated objects and represents that three relationships may exist. For example, A/B may represent the following three cases: Only A exists, both A and B exist, and only B exists.

FIG. 1 is a schematic diagram of an application scenario of a communication method according to an embodiment of this application. As shown in FIG. 1, the scenario includes a macro base station 1, a micro base station 2, a micro base station 3, and UE 4. The UE 4 is located within a coverage area of one or more cells (carriers) provided by the macro base station 1, the micro base station 2, and the micro base station 3. In other words, one or more cells may provide a service for the UE 4. When a plurality of cells provide a service for UE, the UE may work in a carrier aggregation (CA), dual connectivity (DC), or coordinated multipoint transmission (CoMP) mode. At least one cell provides more than one air interface format, and simultaneously provides a radio resource for the UE. In addition, a band of one cell may be divided into a plurality of subbands, and each subband is a BWP. The UE may send and receive data on an activated BWP. This application may be applied to a long term evolution (LTE) communications system, a universal mobile telecommunications system (UMTS), a code division multiple access (CDMA) system, a wireless local area network (WLAN), a future (the fifth generation, 5G) wireless communications system, or the like.

A base station may configure a plurality of BWPs for each UE, but the base station selectively activates some or all of the BWPs. The UE can send and receive data only on the activated BWP, and the UE stores only configuration information of another BWP that is not activated.

Currently, a standardization organization, namely, the 3rd Generation Partnership Project (3GPP), specifies that physical layer downlink control information (DCI) is used to indicate activation or deactivation of a BWP. However, there is no feedback mechanism for the signaling, namely, the DCI, a base station cannot know whether UE successfully receives the DCI, and consequently the UE and the base station are likely to have inconsistent understanding of a current BWP. In a communication method provided in the embodiments of this application, after successfully receiving an indication that is sent by a base station and that is used to instruct to activate or deactivate a BWP, UE feeds back acknowledgment information to the base station, to ensure that the UE and the base station have consistent understanding of a current BWP. Therefore, communication quality is improved.

Figure 2:
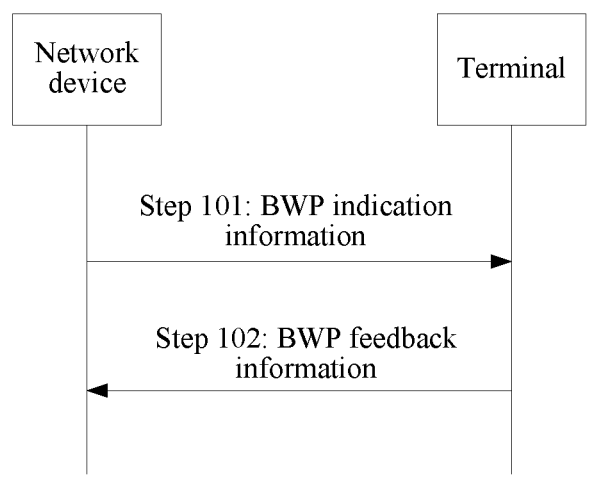
FIG. 2 is an interaction flowchart of a communication method according to an embodiment of this application.

FIG. 2 is an interaction flowchart of a communication method according to an embodiment of this application. The method is based on the architecture shown in FIG. 1. A terminal is equivalent to the UE in FIG. 1, and a network device is equivalent to the macro base station or the micro base station in FIG. 1. As shown in FIG. 2, the method includes the following steps.

Step 101: The network device sends BWP indication information to UE.

The BWP indication information is used to instruct the terminal to activate a BWP and/or deactivate a BWP.

In this embodiment, when needing to activate or deactivate a BWP, a base station sends the BWP indication information to the terminal. The BWP indication information may be a control indication, for example, a DCI indication, sent by the network device through a control channel, or may be another indication sent by the network device through another type of channel. The BWP indication information may include a BWP identifier used to instruct to activate or deactivate a BWP corresponding to the identifier.

Step 102: The UE sends BWP feedback information to a base station.

The BWP feedback information is used to indicate that the terminal successfully receives the BWP indication information.

In this embodiment, after receiving the BWP indication information and successfully parsing the BWP indication information, the UE sends the BWP feedback information to the base station, to notify the base station that the terminal successfully receives the BWP indication information.

In the communication method provided in this embodiment, the network device sends, to the UE, the BWP indication information used to instruct the terminal to activate a BWP and/or deactivate a BWP, and after successfully receiving the BWP indication information, the UE sends the BWP feedback information to the base station, to notify the base station that the BWP indication information is successfully received. In this way, a data transmission failure that is caused because when the UE cannot receive or cannot correctly parse the BWP indication information, the UE and the base station communicate by using different BWPs can be avoided, thereby improving data transmission quality.

Optionally, the BWP feedback information is included in a media access control (MAC) layer message.

In this embodiment, when the BWP indication information is a control indication sent by the base station through the control channel, the UE may generate the BWP feedback information at a MAC layer, to notify the base station that the BWP indication information is successfully received, to ensure transmission reliability of the BWP indication information. The BWP feedback information may be a MAC control element (CE) message.

Further, the MAC layer message includes a MAC subheader or includes a MAC subheader and a MAC payload. The MAC subheader includes a logical channel identifier (LCID), and the LCID is used to indicate that the terminal successfully receives the BWP indication information.

In this embodiment, the MAC layer message may include only the MAC subheader, to be specific, the MAC layer message has a payload with a fixed length of 0, that is, the payload includes no information. After receiving the MAC layer message fed back by the UE, the base station considers that the UE already successfully receives the BWP indication information used to instruct to activate or deactivate a BWP. The MAC subheader includes the LCID used to indicate that the terminal successfully receives the BWP indication information.

A format of the BWP feedback information is described below in detail by using an example in which the BWP feedback information is a MAC CE message.

In this embodiment, the MAC CE message may be included in a subheader of a MAC protocol data unit (PDU). The LCID may occupy a field in the MAC subheader. The MAC PDU further includes a MAC service data unit (SDU).

Figure 3:
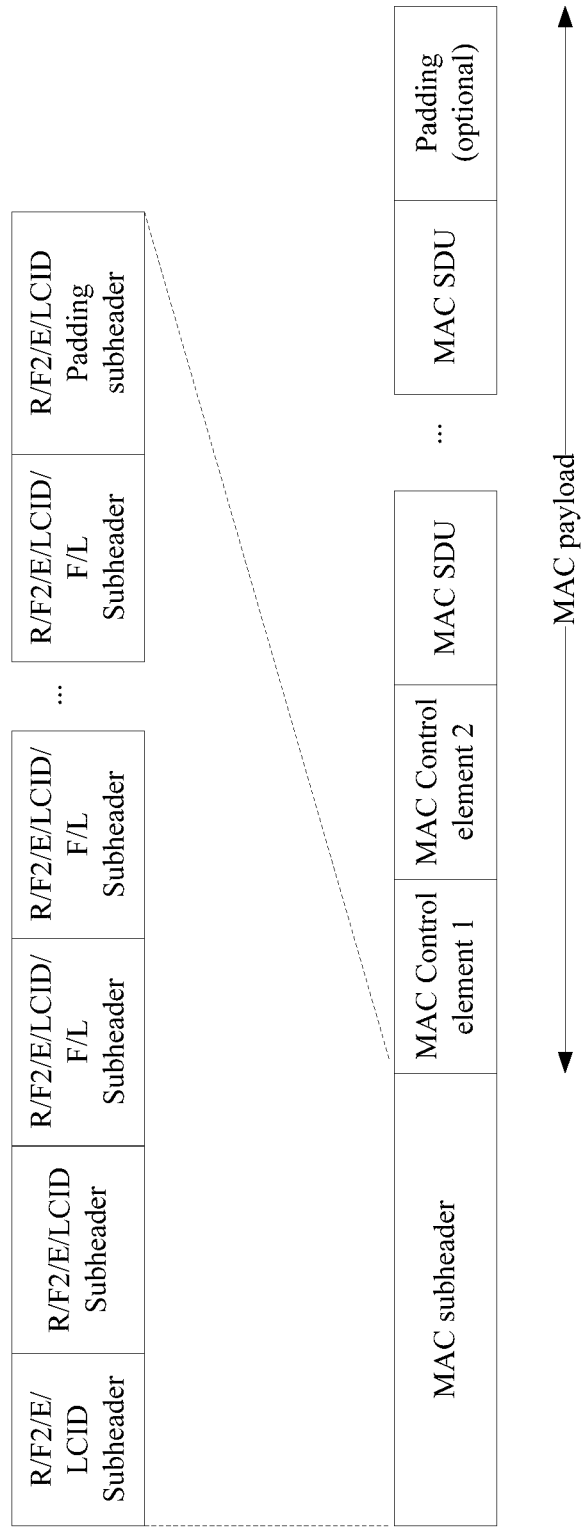
FIG. 3 is a schematic diagram of a format of BWP feedback information according to an embodiment of this application.
Figure 4:
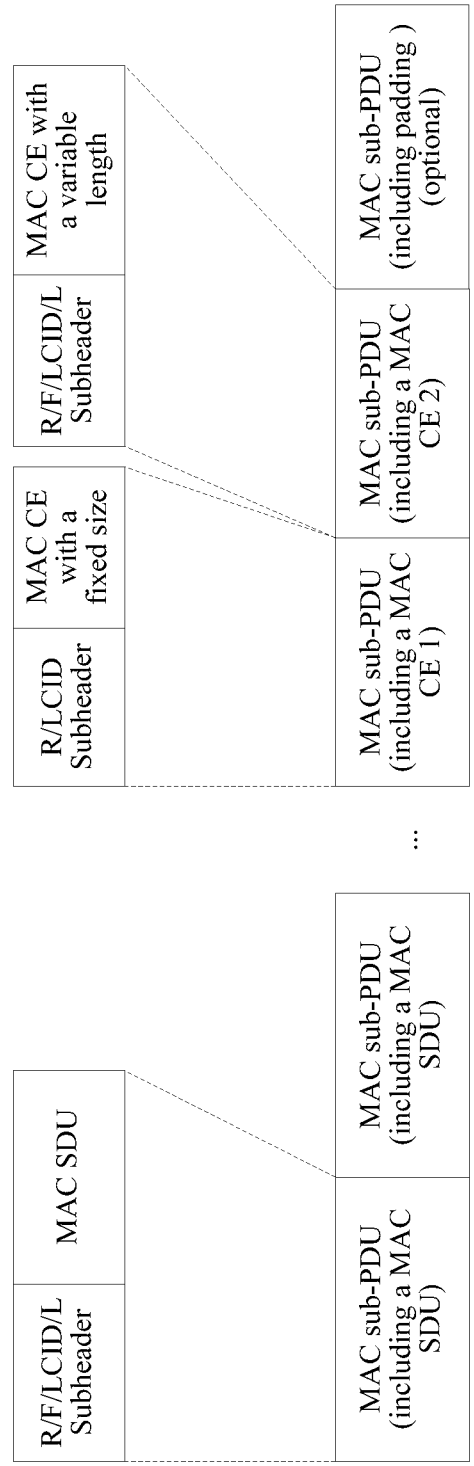
FIG. 4 is a schematic diagram of a format of another BWP feedback information according to an embodiment of this application.

As shown in FIG. 3 and FIG. 4, specifically, the MAC CE may be located in the MAC PDU in either of the following two manners:

In a first manner, subheaders of all MAC CE messages are included in the MAC subheader, and MAC control elements of all the MAC CE messages and all MAC SDUs are included in a MAC payload. As shown in FIG. 3, a plurality of subheaders including LCIDs constitute the MAC subheader, and a plurality of MAC control elements and a plurality of MAC SDUs constitute the MAC payload.

In a second manner, it is set that a subheader of each MAC CE message is before a corresponding MAC payload. As shown in FIG. 4, a subheader including an LCID is followed by a MAC SDU, or a subheader including an LCID is followed by a MAC control element.

Optionally, the MAC payload includes an identifier of the activated BWP or an identifier of the deactivated BWP.

Optionally, if the BWP indication information includes a plurality of to-be-activated or to-be-deactivated BWPs, the MAC payload may include information about one or more of the BWPs.

Figure 5:
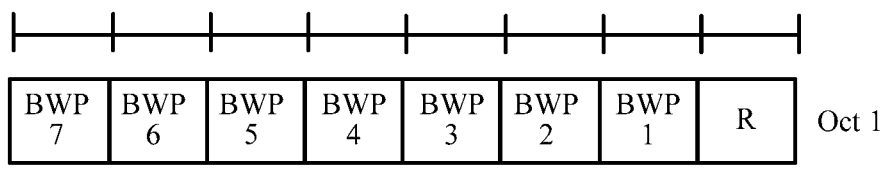
FIG. 5 shows a bitmap of a MAC payload according to an embodiment of this application.

For example, the MAC payload may be in a form of a bitmap. A possible form is shown in FIG. 5. In FIG. 5, seven BWPs are used as an example for description. Each BWP is associated with an identifier. A BWP k is set to 1 to indicate that the UE successfully receives indication information used to activate or deactivate the BWP k, or a BWP k may be set to 0 to indicate that the UE receives indication information used to activate or deactivate the BWP k. R is a reserved bit. The payload may alternatively include only one BWP or any integer quantity of BWPs. This is not limited in this application.

Optionally, the MAC payload may include information only about the activated or deactivated BWP indicated in the BWP indication information. The information about the BWP may be in a form of the bitmap shown in FIG. 5, or is indicated in a form of a BWP identifier.

Figure 6:
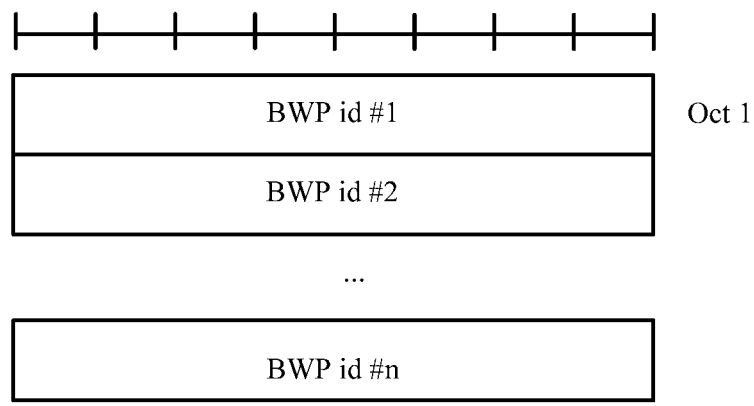
FIG. 6 is a schematic diagram of a BWP identifier according to an embodiment of this application.

For example, the information about the activated or deactivated BWP is indicated in a form of a BWP identifier. As shown in FIG. 6, several bits may be used to indicate the BWP identifier. In this embodiment, 8 bits are used as an example, but no limitation is constituted by any integer quantity of bits. A BWP identifier carried in the MAC payload is the information about the activated or deactivated BWP indicated in the BWP indication information received by the UE. In other words, when the UE activates or deactivates a BWP based on the BWP indication information, the MAC payload carries an identifier of the BWP.

Further, the MAC payload further includes a carrier component identifier. The carrier component identifier is used to indicate a carrier on which the activated BWP is located or a carrier on which the deactivated BWP is located.

Figure 7:
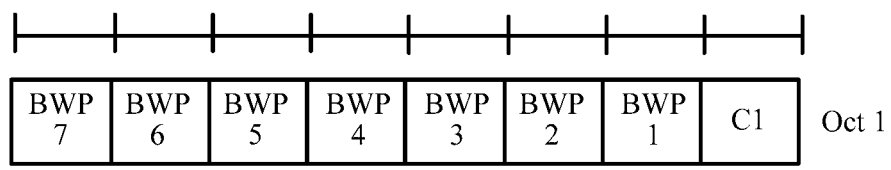
FIG. 7 is a schematic diagram of a format of a MAC payload according to an embodiment of this application.

For example, as shown in FIG. 7, a reserved field in the MAC payload is set to the carrier component identifier, to indicate that the UE receives the indication information used to activate or deactivate the BWP k on a carrier 1. Especially, when there is an indication of activating or deactivating a BWP across carriers, the carrier component identifier is set, so that the base station and the UE can transmit data on a same carrier, to ensure data transmission reliability.

Optionally, based on the embodiment shown in FIG. 2 to FIG. 7, step 102 of "sending, by the terminal, BWP feedback information to a base station" includes: sending, by the terminal, the BWP feedback information on the activated BWP: or sending, by the terminal, the BWP feedback information on the deactivated BWP: or sending, by the terminal, the BWP feedback information on a second carrier component, where the activated BWP or the deactivated BWP is a frequency resource on a first carrier component.

For example, if the BWP indication information is only used to activate at least one BWP and there is no previously activated BWP, the UE sends the BWP feedback information on the activated BWP. For example, if the BWP indication information requires a BWP 2 to be activated, the UE sends the feedback information on the BWP 2 after activating the BWP 2.

For example, if the UE already has an available activated BWP, a previous BWP is deactivated by default (only one BWP is activated at a same time by default). The BWP feedback information may be sent on the previously activated BWP, or may be sent on the activated BWP. For example, the UE sends and receives data by using a BWP 1, the BWP indication information requires a BWP 2 to be activated, and the UE deactivates the BWP 1 by default. In this case, the UE may send the BWP feedback information on the BWP 1 before deactivating the BWP 1, or the UE sends the BWP feedback information on the activated BWP 2.

For example, if the BWP indication information is only used to deactivate at least one BWP, the BWP feedback information is sent on the BWP before the BWP is deactivated. For example, if the BWP indication information instructs to deactivate a BWP 1, the UE sends the BWP feedback information on the BWP 1.

For example, if the BWP indication information is not only used to activate at least one BWP but also used to deactivate at least one BWP, the BWP feedback information may be sent on the deactivated BWP or may be sent on the activated BWP. For example, if the BWP indication information instructs to deactivate a BWP 1 and activate a BWP 2, the UE may send the BWP feedback information on the BWP 1 before the BWP 1 is deactivated, or may send the BWP feedback information on the BWP 2 after the BWP 2 is activated.

For example, the UE may alternatively send the BWP feedback information across carriers. For example, if the BWP that the BWP indication information instructs to activate or deactivate is a frequency resource on a carrier C1, the UE sends the BWP feedback information on a carrier C2. The carrier C1 and the carrier C2 are two different carriers.

In the method in this embodiment, the BWP feedback information may be sent in a plurality of flexibly changeable manners, to ensure transmission reliability of the BWP feedback information.

Optionally, when the BWP indication information is used to instruct the terminal to activate a BWP, the method further includes: activating a transmission resource on the activated BWP.

The transmission resource may include an SPS resource, a CSI resource, an SR resource, or the like.

In this embodiment, when the BWP indication information is used to instruct the terminal to activate a BWP, the UE automatically activates an SPS resource on the BWP that needs to be activated, and the base station does not need to instruct, by using signaling on a PDCCH, to activate the SPS resource. Therefore, the signaling can be saved.

Optionally, when the BWP indication information is used to instruct the terminal to deactivate a BWP, the method further includes: releasing an SPS resource on the deactivated BWP.

In this embodiment, when the BWP indication information is used to instruct the terminal to deactivate a BWP, the UE automatically releases an SPS resource on the BWP that needs to be deactivated, and the base station does not need to instruct, by using signaling on a PDCCH, to release the SPS resource. Therefore, the signaling can be saved.

Optionally, when the BWP indication information is used to instruct the terminal to activate a BWP, the method further includes: initializing a HARQ process for the activated BWP.

In this embodiment, when the BWP indication information is used to instruct the terminal to activate a BWP, the UE automatically initializes the HARQ process for the activated BWP, and the base station does not need to configure a HARQ process by using signaling on a PDCCH. Therefore, the signaling can be saved.

When the base station performs an activation or deactivation operation on a BWP, some functions of the MAC layer also need to be processed. For example, after an SPS resource is configured, the SPS resource cannot be used by the UE, and needs to be activated by using a PDCCH scrambled by using an SPS-radio network temporary identifier (SPS-RNTI). After the SPS resource is activated, the UE may periodically receive and send data by using the configured SPS resource. For grant-free (GF) transmission, activation does not need to be performed by using a PDCCH, and the UE may perform GF transmission after receiving radio resource control (RRC) signaling that configures a GF resource. SPS and GF are similar in other aspects. For brevity, the SPS is used to indicate the SPS and the GF below.

After the base station specifies, at a moment by using PDCCH signaling scrambled by using the SPS-RNTI, the SPS resource used by the UE, the base station does not need to specify the allocated resource by delivering, in a time domain location corresponding to the SPS resource, new PDCCH signaling scrambled by using the SPS-RNTI. The UE periodically receives or sends data by using the SPS resource. The following embodiment mainly describes how to process, after a base station activates or deactivates a BWP, an SPS resource configured on the BWP.

Figure 8:
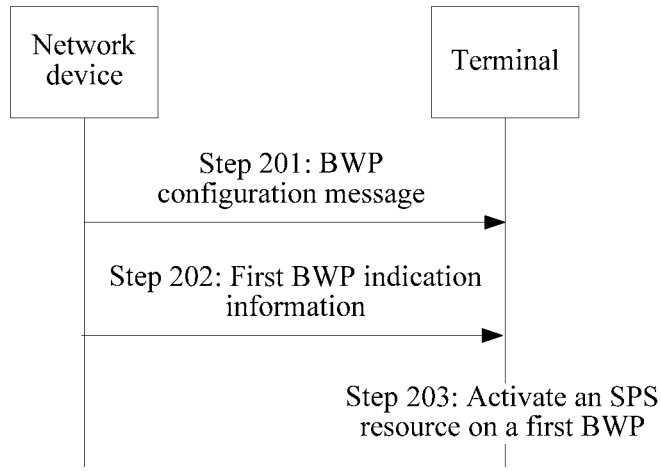
FIG. 8 is an interaction flowchart of a communication method according to another embodiment of this application.

FIG. 8 is an interaction flowchart of a communication method according to another embodiment of this application. The method mainly relates to a solution of automatically activating, by a terminal, an SPS resource after a base station instructs the terminal to activate a BWP. As shown in FIG. 8, the method includes the following steps.

Step 201: A network device sends a BWP configuration message to the terminal.

The configuration message is used to configure an SPS resource of a BWP.

In this embodiment, the BWP configuration message may be an RRC message.

Optionally, the RRC message may be system information that is not limited to minimum system information (minimum SI) and/or remaining system information. Alternatively, the RRC message may be a UE-specific RRC message.

Optionally, the BWP configuration message may include configuration information of one or more BWPs. For example, the BWP configuration message may include at least one of the following configurations: a BWP identifier used to indicate a BWP configured by the network device for UE: a BWP time domain resource used to indicate a time domain location of a BWP resource, where the time domain location may be indicated by using a subframe, a transmission time interval, a slot, a physical downlink control channel occasion, or the like, for example, a subframe K indicates that the BWP resource is available in the subframe K; and a BWP frequency domain resource used to indicate a frequency domain location of a BWP resource, where the frequency domain location may be indicated by using a physical resource block (PRB) start location or a PRB end location, a quantity of PRBs, or the like.

Optionally, the BWP configuration message may include SPS resource information of at least one BWP.

Optionally, SPS resource information may include at least one of the following configurations of the SPS resource: an uplink SPS transmission resource time interval or a period: a downlink SPS transmission resource time interval or a period: a frequency domain location of an SPS transmission resource, for example, a PRB start location or a PRB end location, or a quantity of PRBs; and a modulation and coding scheme used to indicate a modulation and coding scheme used in SPS resource transmission.

Optionally, in this embodiment, the base station may configure a corresponding SPS resource for each BWP of the terminal. When the base station instructs the terminal to activate a BWP, the terminal activates an SPS resource corresponding to the BWP. Alternatively, the base station may configure only one SPS resource for the terminal, and there is a mapping relationship between each BWP and the SPS resource. When the base station instructs the terminal to activate a BWP, the terminal activates, based on the mapping relationship between the BWP and the SPS resource, the SPS resource corresponding to the BWP that needs to be activated.

Step 202: The terminal receives first BWP indication information sent by the network device.

The first BWP indication information is used to instruct the terminal to activate a first BWP.

In this embodiment, for a type and a format of the first BWP indication information, refer to the implementation of the BWP indication information in the embodiment shown in FIG. 2 to FIG. 7. Details are not described herein again.

Step 203: The terminal activates an SPS resource on a first BWP.

In this embodiment, after receiving the first BWP indication information, the terminal automatically activates the SPS resource on the first BWP.

In the prior art, after instructing the terminal to activate the first BWP, the base station further needs to instruct, by using control signaling on a PDCCH, the terminal to activate the SPS resource on the first BWP. In comparison with the prior art, in the communication method provided in this embodiment, the network device sends, to the terminal, the BWP configuration message used to configure an SPS resource of a BWP, and after receiving the first BWP indication information sent by the network device, the terminal automatically activates the SPS resource on the first BWP, and the base station does not need to send a separate indication used to activate an SPS resource. Therefore, signaling overheads are reduced.

Figure 9:
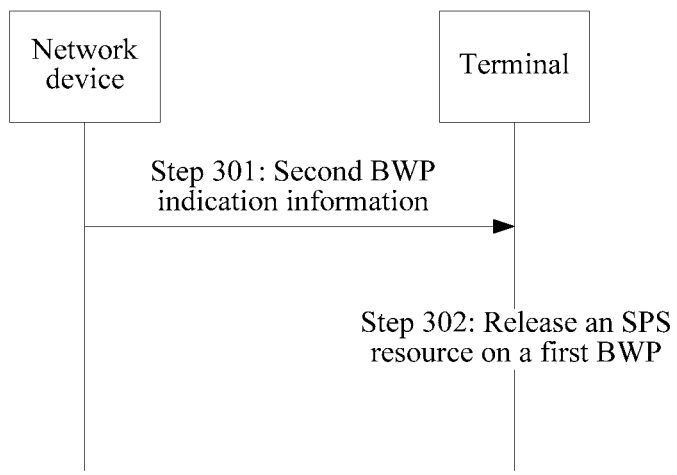
FIG. 9 is an interaction flowchart of a communication method according to another embodiment of this application.

FIG. 9 is an interaction flowchart of a communication method according to another embodiment of this application. The method mainly relates to a solution of automatically releasing, by a terminal, an SPS resource after a base station instructs the terminal to deactivate a BWP. Based on the embodiment shown in FIG. 8, as shown in FIG. 9, the method further includes the following steps.

Step 301: The network device sends second BWP indication information to the terminal.

The second BWP indication information is used to instruct the terminal to deactivate the first BWP.

In this embodiment, for a type and a format of the second BWP indication information, refer to the implementation of the BWP indication information in the embodiment shown in FIG. 2 to FIG. 7. Details are not described herein again.

Step 302: The terminal releases the SPS resource on the first BWP.

Figure 10:
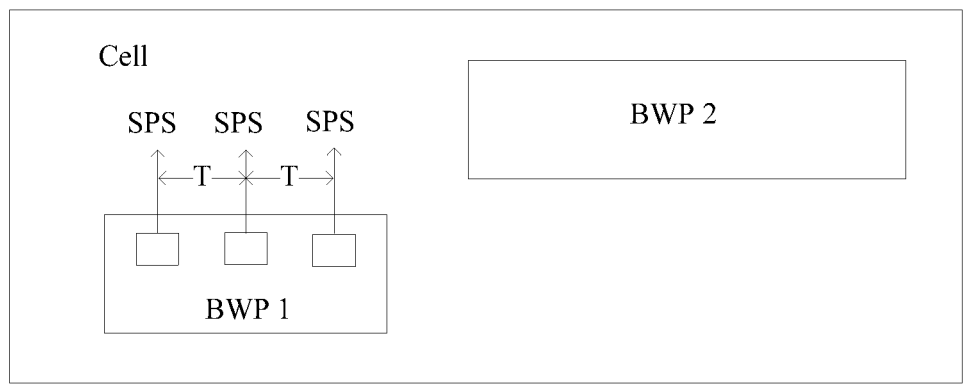
FIG. 10 is a schematic diagram of an SPS resource on a BWP according to an embodiment of this application.

In this embodiment, after receiving the second BWP indication information that is sent by the base station and that is used to instruct the terminal to deactivate the first BWP, the terminal considers that the SPS resource on the first BWP is invalid. In this case, the terminal automatically releases the SPS resource on the first BWP. As shown in FIG. 10, after the base station instructs the terminal to deactivate a BWP 1 and the terminal migrates from the BWP 1 to a BWP 2, an SPS resource on the BWP 1 is not valid.

Optionally, if the terminal receives a deactivation indication of a carrier component used to deactivate an indicated carrier component, the terminal may also consider that at least one BWP or all BWPs on the carrier component are not valid.

Optionally, if the terminal receives a deactivation indication of a carrier component used to deactivate an indicated carrier component, the terminal may also consider that at least one SPS resource or all SPS resources on the carrier component are not valid.

Optionally, if the terminal configures only one BWP on a carrier component, when the terminal receives the BWP indication information used to deactivate the BWP, the terminal may consider that the carrier component is to be deactivated, in other words, the carrier component is not valid.

In the prior art, after instructing the terminal to deactivate the first BWP, the base station further needs to instruct, by using control signaling on a PDCCH, the terminal to release the SPS resource on the first BWP. In comparison with the prior art, in the communication method provided in this embodiment, the network device sends, to the terminal, the second BWP indication information used to instruct the terminal to deactivate the first BWP, and after receiving the second BWP indication information, the terminal automatically releases the SPS resource on the first BWP, and the base station does not need to send a separate indication used to release an SPS resource. Therefore, signaling overheads are reduced.

Further, the second BWP indication information is further used to instruct the terminal to activate a second BWP, and the method further includes: determining, by the terminal, an SPS resource on the second BWP based on information about the second BWP and the SPS resource on the first BWP.

In this embodiment, the terminal may determine the SPS resource on the second BWP based on the information about the second BWP and the SPS resource on the first BWP. For example, the terminal may determine the SPS resource on the second BWP based on a PRB start location and a PRB end location and a PRB interval of the SPS resource on the first BWP and a PRB start location and a PRB end location and a PRB interval of the second BWP.

In this embodiment, the terminal may determine the SPS resource on the second BWP based on the information about the second BWP and the SPS resource on the first BWP, and the base station does not need to indicate information about the SPS resource on the second BWP by using separate signaling. Therefore, signaling overheads are reduced.

Optionally, an offset between a PRB number of a start location of the SPS resource on the second BWP and a PRB number of a start resource location of the second BWP is the same as an offset between a PRB number of a start location of the SPS resource on the first BWP and a PRB number of a start resource location of the first BWP.

Figure 11:
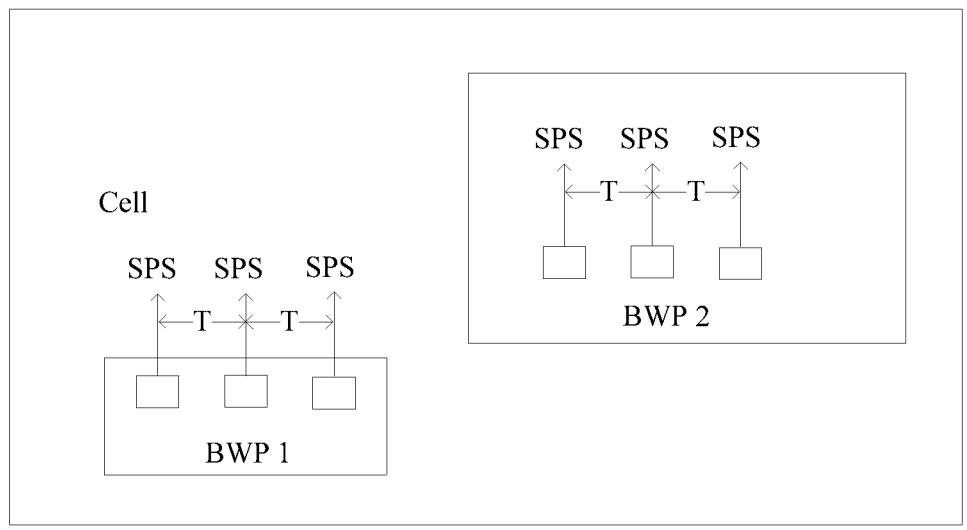
FIG. 11 is a schematic diagram of an SPS resource on another BWP according to an embodiment of this application.

In this embodiment, after receiving the second BWP indication information, the UE migrates an SPS resource on the BWP 1 to the BWP 2, and a relative location of the SPS resource in PRB resources remains unchanged. As shown in FIG. 11, the PRB number of the start resource location of the first BWP is PRB 0 and the PRB number of the start location of the SPS resource on the first BWP is PRB 3. Therefore, the offset between the PRB number of the start location of the SPS resource on the first BWP and the PRB number of the start resource location of the first BWP is three PRBs. If the PRB number of the start resource location of the second BWP is PRB 2, the PRB number of the start location of the SPS resource on the second BWP is PRB 5. Therefore, the offset between the PRB number of the start location of the SPS resource on the second BWP and the PRB number of the start resource location of the second BWP is also three PRBs.

It should be noted that in comparison with the BWP 1, a PRB number of an SPS frequency domain resource on the BWP 2 remains unchanged, and a time location of the SPS resource remains unchanged. If the PRB number exceeds a range of the BWP 2, some or all SPS frequency domain resources are unavailable. In addition, a bandwidth of an SPS resource may proportionally change with a bandwidth of a BWP.

Optionally, an absolute time of a period of the SPS resource on the second BWP is the same as an absolute time of a period of the SPS resource on the first BWP.

Figure 12:
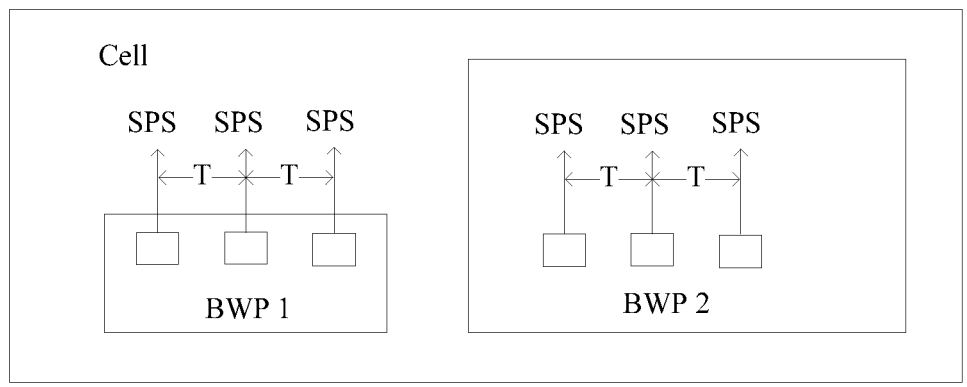
FIG. 12 is a schematic diagram of an SPS resource on still another BWP according to an embodiment of this application.

In this embodiment, after receiving the second BWP indication information, the UE migrates the SPS resource on the BWP 1 to the BWP 2, and an absolute location of the SPS resource remains unchanged. As shown in FIG. 12, the UE migrates from the BWP 1 to the BWP 2, and the BWP 1 is totally included in the BWP 2. In this case, a frequency domain location of an SPS resource on the BWP 2 is the same as a frequency domain location of the SPS resource on the BWP 1, but PRB numbers of the two SPS resources on the two BWPs may be different. In addition, a time domain location of the SPS resource on the BWP 2 is also the same as a time domain location of the SPS resource on the BWP 1. Therefore, an absolute location of the SPS resource on the BWP 2 is the same as an absolute location of the SPS resource on the BWP 1. This is equivalent to that after migrating from the BWP 1 to the BWP 2, the UE may directly use, on the BWP 2, the SPS resource on the BWP 1 to transmit data.

The following describes implementations of a time domain location and a frequency domain location of an SPS resource in detail.

There may be the following two implementations for determining a time domain location of an SPS resource:

One possible implementation is as follows:

An interval of the SPS resource on the BWP 1 is configured as N uplink time units. The time unit may be indicated by using a subframe, a transmission time interval (TTI), a slot, a physical downlink control channel occasion (PDCCH occasion), a symbol, or the like. For example, the interval of the SPS transmission resource is six symbols, and it indicates that a continuous interval of the SPS resource is six symbols.

Optionally, a start time location and an end time location of an SPS transmission occasion corresponding to the SPS resource may be deduced by using a calculation formula, or configured in a protocol by default. A specific configuration manner is not limited in this embodiment.

Optionally, a length of the time unit such as a length of the subframe, a length of the TTI, a length of the slot, a length of the PDCCH occasion, or a length of the symbol is related to an air interface format of the BWP 1.

For example, when the UE switches from the BWP 1 to the BWP 2, an SPS transmission time interval is still N time units, but the length of the time unit depends on a length of a time unit corresponding to the BWP 2. For example, the SPS transmission time interval on the BWP 2 is still six symbols, but a length of the symbol is related to an air interface format of the BWP 2. The length of the symbol may be the same as or different from the length of the symbol on the BWP 1.

The other possible implementation is as follows:

For example, an interval of the SPS resource on the BWP 1 is configured as N uplink time units. The time unit may be an absolute time unit such as millisecond, microsecond, or second. For example, the interval of the SPS resource is six milliseconds, and it indicates that a continuous interval of the SPS resource is six milliseconds. When the UE switches from the BWP 1 to the BWP 2, a transmission time interval of the SPS resource is still N time units. For example, the time interval of the SPS resource on the BWP 2 is still six milliseconds. Therefore, an absolute time of the SPS resource remains unchanged.

There may be the following two implementations for determining a frequency domain location of an SPS resource:

One possible implementation is as follows:

For example, the second BWP indication information used to activate the BWP 2 is sent on the BWP 1, and a frequency domain location of the SPS resource on the BWP 2 is deduced at a MAC layer by using a frequency domain location of the BWP 2. For example, a PRB location of the SPS resource on the BWP 2 is deduced based on a PRB start location and a PRB end location on the BWP 2.

The other possible implementation is as follows:

For example, separate physical layer signaling, for example, may be activation signaling of the BWP 2 or activation signaling of the SPS resource, is designed. The signaling includes a frequency domain location of the SPS resource on the BWP 2. In this way, a PRB location of the SPS resource on the BWP 2 may be directly determined at an MAC layer based on an indication of the activation signaling.

It should be noted that in the solution in this embodiment, it is assumed that the BWP 1 and the BWP 2 overlap in frequency domain and at least some SPS frequency resources are located in an overlapping area. Otherwise, the UE considers that the SPS configuration is invalid, and the base station may activate SPS on a new frequency domain resource by using a new indication.

In a communications system, to ensure data transmission quality, the terminal needs to report a power headroom report (PHR) to the base station. A difference between maximum transmit power of the UE and uplink transmit power currently obtained through evaluation is reported in the PHR. After receiving the PHR, the base station knows available uplink power headroom of the UE. Currently, both BWP activation and deactivation may trigger reporting of the PHR, and the BWP activation and deactivation may be frequently performed. Consequently, many transmission resources are occupied due to frequent reporting of the PHR.

Figure 13:
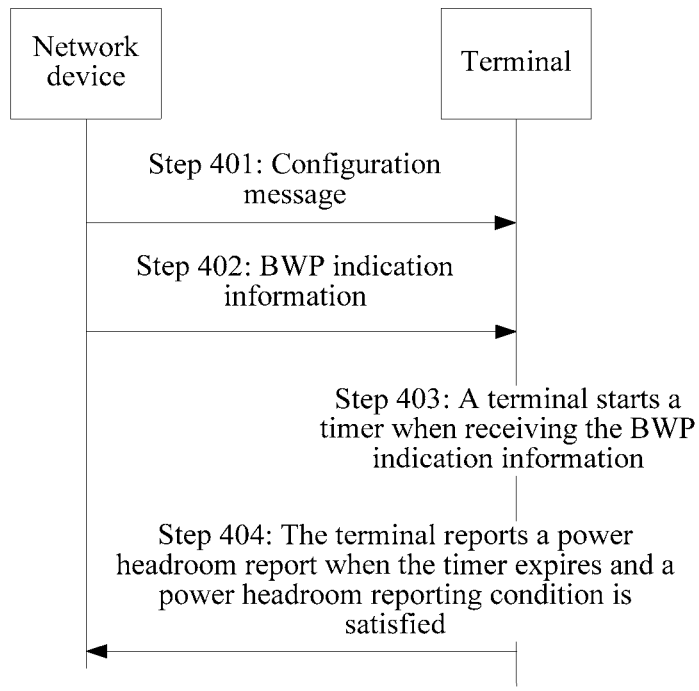
FIG. 13 is an interaction flowchart of a communication method according to another embodiment of this application.

FIG. 13 is an interaction flowchart of a communication method according to another embodiment of this application. The method mainly relates to an implementation process of suppressing frequent reporting of a PHR in BWP activation and deactivation processes. As shown in FIG. 13, the method includes the following steps.

Step 401: A network device sends a BWP configuration message to a terminal.

The configuration message is used to indicate duration of a timer.

Optionally, the BWP configuration message may include configuration information of one or more BWPs. For example, the BWP configuration message may include at least one of the following configurations: a BWP identifier used to indicate a BWP configured by the network device for UE: a BWP time domain resource used to indicate a time domain location of a BWP resource, where the time domain location may be indicated by using a subframe, a transmission time interval, a slot, a physical downlink control channel occasion, or the like, for example, a subframe K indicates that the BWP resource is available in the subframe K; and a BWP frequency domain resource used to indicate a frequency domain location of a BWP resource, where the frequency domain location may be indicated by using a physical resource block (PRB) start location or a PRB end location, a quantity of PRBs, or the like.

In this embodiment, the timer is a BWP prohibit timer configured by a base station.

Optionally, duration of the BWP prohibit timer may be carried in an RRC message sent by the base station to the UE.

Further, the base station may configure a prohibit PHR timer for the UE, and the configuration message includes duration of the timer.

The BWP prohibit timer and the prohibit PHR timer may be a same timer, or may be two independent timers.

Step 402: The network device sends BWP indication information to the terminal.

The BWP indication information is used to instruct the terminal to activate a BWP or deactivate a BWP.

In this embodiment, for a type and a format of the BWP indication information, refer to the implementation of the BWP indication information in the embodiment shown in FIG. 2 to FIG. 7. Details are not described herein again.

Step 403: The terminal starts a timer when receiving the BWP indication information.

In this embodiment, starting of the timer is triggered by replacement of a BWP. For example, when receiving the indication information used to instruct to activate or deactivate a BWP, the UE starts the timer, and after the timer expires or the timer has expired, if receiving BWP indication information again, the UE restarts the timer.

Step 404: The terminal reports a power headroom report when the timer expires and a power headroom reporting condition is satisfied.

In this embodiment, if the UE receives the indication information used to instruct to activate or deactivate a BWP, and the BWP prohibit timer expires or has expired, PHR reporting is triggered at a MAC layer, and the BWP prohibit-timer is started or restarted. If the UE does not receive the indication information used to instruct to activate or deactivate a BWP, or the BWP prohibit timer does not expire, no PHR reporting is triggered. During running of the BWP prohibit-timer, although the power headroom reporting condition is satisfied, no PHR reporting is triggered.

Optionally, the power headroom reporting condition includes that the terminal receives another BWP indication information.

In this embodiment, when receiving BWP indication information, the terminal starts the BWP prohibit-timer. When the terminal receives another BWP indication information sent by the base station, if the power headroom reporting condition is satisfied, but the BWP prohibit-timer does not expire, no PHR reporting is triggered.

The power headroom reporting condition may further include another condition, for example, when a periodic PHR timer expires, the network device reconfigures BWP configuration information.

Figure 14:
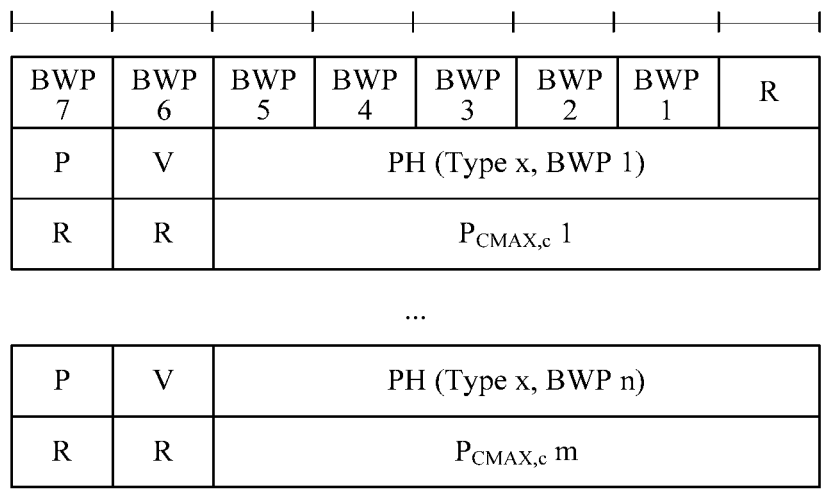
FIG. 14 is a schematic diagram of a format of a PHR according to an embodiment of this application.

For example, a format of the PHR is shown in FIG. 14. The PHR includes a BWP identifier BWP i and a power headroom (PH) value corresponding to the BWP i. The PH value is used to indicate power headroom of the UE. The BWP i is used to indicate whether the PH value of the BWP i of a serving cell exists. For example, when BWPi=1, it indicates that the PHR includes the PH value of the BWP i. For another field, refer to a definition in LTE. For example, P indicates whether power backoff of power management is required, V indicates whether the PH value is calculated based on actual transmission or a reference format, Type x indicates a power headroom type, and $P_{CMAX,c}$ indicates corresponding nominal transmit power of the UE.

In the communication method provided in this embodiment of this application, the network device sends, to the terminal, the configuration message used to indicate duration of a timer, the terminal starts the timer when receiving the BWP indication information sent by the base station, and the terminal reports the power headroom report when the timer expires and the power headroom reporting condition is satisfied. Therefore, a quantity of times of reporting the PHR can be reduced, and a transmission resource can be saved.

In a communications system, when finding that an error occurs in a received data packet, a receive end feeds back the error to a transmit end, and the transmit end retransmits the data packet. Because several data packets may be simultaneously transmitted, to identify data transmissions that are used to transmit same data packets, each data packet is associated with a hybrid automatic repeat request (HARQ)

process. Each HARQ process corresponds to a HARQ process ID used to identify the HARQ process, and a plurality of HARQ processes are managed by a HARQ entity. After BWPs are activated or deactivated, how to process HARQ processes on the BWPs is a problem that needs to be resolved.

Figure 15:
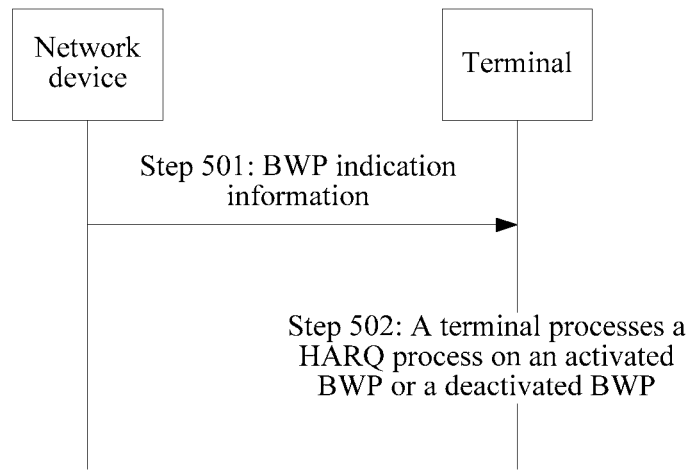
FIG. 15 is an interaction flowchart of a communication method according to still another embodiment of this application.

FIG. 15 is an interaction flowchart of a communication method according to still another embodiment of this application. The method mainly relates to an implementation process of processing a HARQ process on a BWP after the BWP is activated or deactivated. As shown in FIG. 15, the method includes the following steps.

Step 501: A network device sends BWP indication information to a terminal.

The BWP indication information is used to instruct the terminal to activate a BWP and/or deactivate a BWP.

In this embodiment, for a type and a format of the BWP indication information, refer to the implementation of the BWP indication information in the embodiment shown in FIG. 2 to FIG. 7. Details are not described herein again.

Step 502: The terminal processes a HARQ process on an activated BWP or a deactivated BWP.

The following describes implementations of step 502 of "processing, by the terminal, a HARQ process on an activated BWP or a deactivated BWP" in detail in a plurality of cases.

In a first implementation, if the BWP indication information is used to instruct to activate a first BWP, the terminal initializes a HARQ process for the activated first BWP.

In this embodiment, when a BWP 1 and a BWP 2 of UE simultaneously work, the UE initializes another set of HARQ processes for the BWP 2, and a HARQ process of the BWP 1 remains unchanged. In this case, a HARQ buffer of the HARQ process of the BWP 1 does not need to be emptied, to ensure data transmission continuity.

In a second implementation, if the BWP indication information is used to instruct to deactivate a first BWP and activate a second BWP, a HARQ process of the first BWP is associated with the second BWP.

In this embodiment, when a base station instructs UE to deactivate an originally activated BWP 1 and activate a BWP 2, a set of HARQ processes of the BWP 1 are directly associated with the BWP 2. For example, a HARQ ID remains unchanged, and a HARQ buffer of the BWP 1 is directly associated with the BWP 2. The UE and the base station continue to perform transmission on the BWP 2 by directly using the original HARQ ID of the BWP 1, and the base station does not need to configure a HARQ process for the BWP 2 by using a new indication. Therefore, overheads are reduced. In addition, the HARQ buffer of the HARQ process of the BWP 1 does not need to be emptied, to ensure data transmission continuity.

In a third implementation, if the BWP indication information is used to instruct to deactivate a first BWP and activate a second BWP, a HARQ process is initialized for the second BWP, and a HARQ process of the first BWP is associated with the initialized HARQ process of the second BWP based on indication signaling.

The indication signaling is used to indicate an association relationship between a HARQ process of the first BWP and an initialized HARQ of the second BWP. The indication signaling may be a separate DCI indication, or may be carried in the BWP indication information.

Optionally, when a base station instructs UE to deactivate an originally activated BWP 1 and activate a BWP 2, after the UE directly associates a set of HARQ processes of the BWP 1 with the BWP 2, at least one of the following two operations is further performed:

A HARQ buffer of a HARQ process for downlink transmission is emptied. Optionally, a variable such as an NDI related to the downlink HARQ process is set to an initial value.

A HARQ buffer of a HARQ process for uplink HARQ transmission is not emptied. Optionally, a variable NDI related to the HARQ process is set to an initial value. For example, the NDI is set to 0. Optionally, if the HARQ process maintains a quantity of HARQ transmissions, the quantity of HARQ transmissions may be set to 0, or the quantity of HARQ transmissions may remain unchanged.

In this way, when the UE receives an uplink resource allocated by the base station and the UE is instructed to perform transmission on the BWP 2 by using a HARQ process N, if the base station indicates that the NDI is 0, the UE retransmits data stored in a buffer corresponding to the HARQ process N, or if the base station indicates that the NDI is 1, the UE transmits new data by using the HARQ process N, and if the HARQ process N maintains a quantity of HARQ transmissions, the quantity of HARQ transmissions is increased by 1.

In this embodiment, another set of HARQ processes are initialized for the BWP 2, and both data buffered in each HARQ process of the BWP 1 and a variable of each HARQ process are copied into a HARQ buffer of the BWP 2. For example, the HARQ processes of the BWP 1 include a HARQ process 1 to a HARQ process 4, and the HARQ processes initialized for the BWP 2 include a HARQ process 1 to a HARQ process 7. Based on the association relationship in the indication signaling sent by the base station, the HARQ process 1 of the BWP 1 is associated with the HARQ process 3 of the BWP 2, the HARQ process 2 of the BWP 1 is associated with the HARQ process 4 of the BWP 2, and so on. In the method, a HARQ buffer of the HARQ process of the BWP 1 does not need to be emptied, to ensure data transmission continuity.

In a fourth implementation, if the BWP indication information is used to instruct to activate a second BWP, the terminal determines whether a first BWP has a HARQ process in which data is being retransmitted. If the first BWP has a HARQ process in which data is being retransmitted, the terminal monitors the first BWP; and activates the second BWP after data retransmission ends.

In this embodiment, if a base station instructs UE to migrate from a BWP 1 to a BWP 2, if a HARQ process, of the BWP 1, in which retransmission is already performed still continues, the base station no longer schedules new transmission. The BWP 2 becomes valid after data retransmission on the BWP 1 ends. A MAC layer needs to notify a physical layer (PHY) of a validity moment of the BWP 2. In the method, continuity of retransmitted data can be ensured. In addition, the base station does not need to schedule retransmission again. Therefore, signaling and a transmission resource are saved.

For example, when a discontinuous reception (DRX) function is configured for the UE, if a data packet corresponding to a HARQ process is not successfully decoded by the UE, the UE needs to start a retransmission timer and starts to monitor a physical layer control channel, so that the UE can successfully receive the retransmitted data packet. In this case, a BWP used by the UE to monitor the physical layer control channel in a running process of the retransmission timer is the same as a BWP used to previously transmit the data packet. For example, a retransmission timer corresponding to HARQ ID #1 is started, and the data packet is transmitted on the BWP 1. In this case, the UE needs to perform monitoring in a physical layer control area corresponding to the BWP 1. The area includes but is not limited to time domain and frequency domain locations of physical layer control information.

Further, HARQ transmission may be transmission of a transport block (TB), for example, the TB is transmitted on the BWP 1, or may be transmission of a coding block (CB), or transmission of a coding block group (CBG) including at least one coding block.

Optionally, a TB of the UE is transmitted on the BWP 1, and the TB may be retransmitted on the BWP 2.

Optionally, a CBG of a TB of the UE is transmitted on the BWP 1 and the CBG may be retransmitted on the BWP 2.

Optionally, if the UE receives the BWP indication information, where the BWP indication information is used to instruct the UE to switch from the BWP 1 to the BWP 2, the BWP indication information becomes valid after several time units or a time length, namely, a validity time of the BWP indication information. For example, the time unit may be a subframe, a transmission time interval, a slot, or a physical downlink control channel transmission occasion, and the time length may include several milliseconds, or seconds, or microseconds.

For example, if the UE receives downlink resource allocation or uplink scheduling grant information on the BWP 1 before the BWP indication information becomes valid, where the downlink resource allocation or uplink scheduling grant information is used to indicate a downlink resource transmission location, a modulation and coding scheme, or the like used to receive at least one TB or a uplink resource transmission location, a modulation and coding scheme, or the like used to transmit at least one TB, and a downlink or uplink resource transmission occasion is after the validity time, the UE receives or sends the TB on the BWP 2 by using the downlink or uplink resource transmission location, the modulation and coding scheme, or the like indicated in the downlink resource allocation or uplink scheduling grant information.

For example, if the UE receives downlink resource allocation or uplink scheduling grant information on the BWP 1 before the BWP indication information becomes valid, where the downlink resource allocation or uplink scheduling grant information is used to indicate a downlink resource transmission location, a modulation and coding scheme, or the like used to receive at least one TB or a uplink resource transmission location, a modulation and coding scheme, or the like used to transmit at least one TB, and a downlink or uplink resource transmission occasion is before the validity time, the UE receives or sends the TB on the BWP 1 by using the downlink or uplink resource transmission location, the modulation and coding scheme, or the like indicated in the downlink resource allocation or uplink scheduling grant information.

For example, if the UE receives downlink resource allocation or uplink scheduling grant information on the BWP 1 before the BWP indication information becomes valid, where the downlink resource allocation or uplink scheduling grant information is used to indicate a downlink resource transmission location, a modulation and coding scheme, or the like used to receive at least one TB or a uplink resource transmission location, a modulation and coding scheme, or the like used to transmit at least one TB, and a transmission occasion of at least one of TBs is before the validity time, the UE receives or sends the TB on the BWP 1 by using the downlink or uplink resource transmission location, the modulation and coding scheme, or the like indicated in the downlink resource allocation or uplink scheduling grant information. If a transmission occasion of at least one of TBs is after the validity time, the UE receives or sends the TB on the BWP 2 by using the downlink or uplink resource transmission location, the modulation and coding scheme, or the like indicated in the downlink resource allocation or uplink scheduling grant information.

In a communications system, channel state information (CSI) is used to notify the base station of downlink channel quality, to help the base station perform downlink scheduling. The base station may further estimate uplink channel quality at different bands by using a sounding reference signal (SRS). A scheduler on a base station side may allocate, based on an uplink channel state estimation, an air interface resource with desirable instantaneous channel quality to the UE for transmission. The UE may simultaneously send SRSs in different serving cells. The SRS may be periodic or aperiodic, and the SRS is configured for the UE by using an RRC message. How to process a CSI resource and/or an SRS resource on a BWP after the BWP is activated or deactivated is a problem that needs to be resolved.

Figure 16:
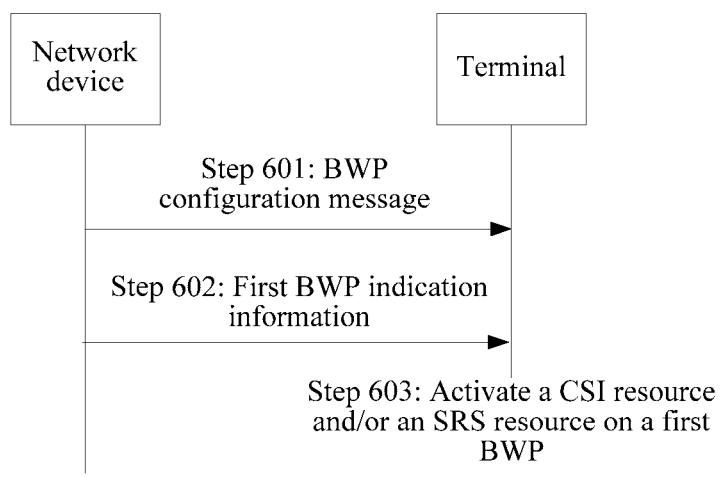
FIG. 16 is an interaction flowchart of a communication method according to still another embodiment of this application.

FIG. 16 is an interaction flowchart of a communication method according to still another embodiment of this application. The method mainly relates to an implementation process of processing a CSI and/or SRS resource on a BWP after the BWP is activated or deactivated. As shown in FIG. 16, the method includes the following steps.

Step 601: A network device sends a BWP configuration message to a terminal.

The BWP configuration message is used to configure a CSI resource and/or an SRS resource of a BWP.

Optionally, the BWP configuration message may be an RRC message, or may be physical layer signaling.

Optionally, a BWP configuration message used to configure a CSI resource of a BWP and a BWP configuration message used to configure an SRS resource of a BWP may be a same message, or may be different messages, and are respectively used to configure a CSI resource of a BWP and an SRS resource of a BWP.

Optionally, the CSI resource may be a semi-persistent CSI resource, or may be a dynamic CSI resource.

Optionally, the SRS resource may be a periodic SRS resource, or may be an aperiodic SRS resource.

Further, the CSI resource and the SRS resource may be sent through a physical uplink control channel (PUCCH), or may be sent through a physical uplink shared channel (PUSCH).

Step 602: The network device sends first BWP indication information to the terminal.

The first BWP indication information is used to instruct the terminal to activate a first BWP.

In this embodiment, for a type and a format of the first BWP indication information, refer to the implementation of the BWP indication information in the embodiment shown in FIG. 2 to FIG. 7. Details are not described herein again.

Step 603: The terminal activates a CSI resource and/or an SRS resource on a first BWP.

In this embodiment, after receiving the first BWP indication information, the terminal automatically activates the CSI resource and/or the SRS resource on the first BWP.

In the prior art, after instructing the terminal to activate the first BWP, a base station further needs to instruct, by using control signaling on a PDCCH, the terminal to activate the CSI resource and/or the SRS resource on the first BWP. In comparison with the prior art, in the communication method provided in this embodiment, the network device sends, to the terminal, the BWP configuration message used to configure a CSI resource and/or an SRS resource of a BWP, and after receiving the first BWP indication information sent by the network device, the terminal automatically activates the CSI resource and/or the SRS resource on the first BWP, and the base station does not need to send a separate indication used to activate a CSI resource and/or an SRS resource. Therefore, signaling overheads are reduced.

Figure 17:
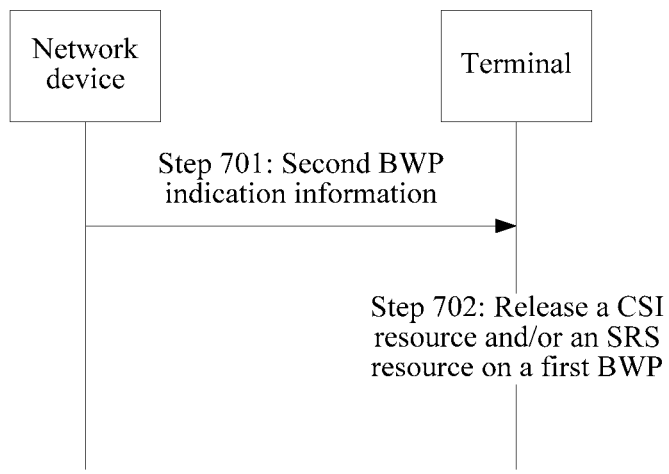
FIG. 17 is an interaction flowchart of a communication method according to yet another embodiment of this application.

FIG. 17 is an interaction flowchart of a communication method according to yet another embodiment of this application. The method mainly relates to a solution of automatically releasing, by a terminal, a CSI resource and/or an SRS resource after a base station instructs the terminal to deactivate a BWP. Based on the embodiment shown in FIG. 16, as shown in FIG. 17, the method further includes the following steps:

Step 701: The network device sends second BWP indication information to the terminal.

The second BWP indication information is used to instruct the terminal to deactivate the first BWP.

In this embodiment, for a type and a format of the second BWP indication information, refer to the implementation of the BWP indication information in the embodiment shown in FIG. 2 to FIG. 7. Details are not described herein again.

Step 702: The terminal releases the CSI resource and/or the SRS resource on the first BWP.

In this embodiment, after receiving the second BWP indication information that is sent by the base station and that is used to instruct the terminal to deactivate the first BWP, the terminal considers that the CSI resource and/or the SRS resource on the first BWP are/is invalid. In this case, the terminal automatically releases the CSI resource and/or the SRS resource on the first BWP, and the base station does not need to send separate signaling used to instruct to release a CSI resource and/or an SRS resource. Therefore, the signaling is saved.

Figure 18:
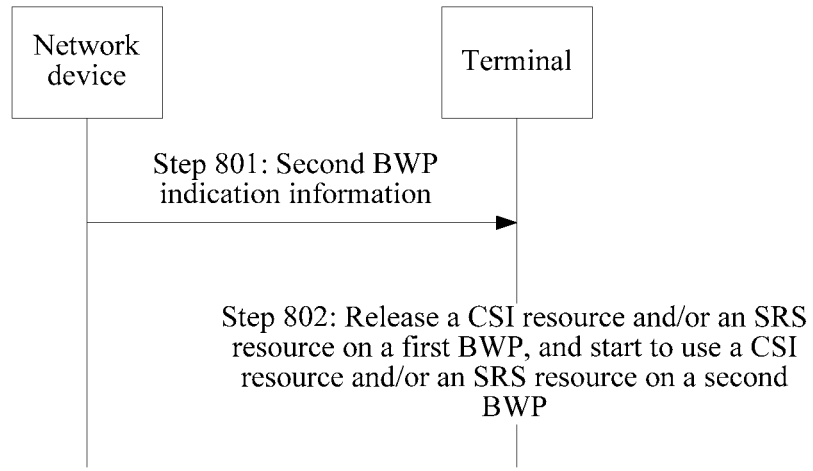
FIG. 18 is an interaction flowchart of a communication method according to yet another embodiment of this application.

FIG. 18 is an interaction flowchart of a communication method according to yet another embodiment of this application. The method mainly relates to a solution of processing, by a terminal, a CSI resource after a base station instructs the terminal to deactivate a BWP 1 and activate a BWP 2. As shown in FIG. 18, the method includes the following steps:

Step 801: A network device sends second BWP indication information to the terminal.

The second BWP indication information is used to instruct the terminal to deactivate a first BWP and activate a second BWP.

In this embodiment, for a type and a format of the second BWP indication information, refer to the implementation of the BWP indication information in the embodiment shown in FIG. 2 to FIG. 7. Details are not described herein again.

Step 802: The terminal releases a CSI resource and/or an SRS resource on a first BWP, and starts to use a CSI resource and/or an SRS resource on a second BWP.

In this embodiment, after receiving the second BWP indication information sent by the base station, the terminal considers that the CSI resource and/or the SRS resource on the first BWP are/is invalid. In this case, the terminal automatically releases the CSI resource and/or the SRS resource on the first BWP, and starts to use the CSI resource and/or the SRS resource on the second BWP, and the base station does not need to send separate signaling used to instruct to release and start to use a CSI resource and/or an SRS resource. Therefore, the signaling is saved.

In a communications system, a scheduling request (SR) is used to notify the base station that the terminal needs to transmit uplink data, so that the base station determines whether to allocate an uplink resource to the terminal. After the terminal sends an SR, if receiving no resource scheduled by the base station, the terminal needs to send the SR again, and increases a maintained variable SR_COUNTER by one, where the SR_COUNTER may be understood as representing a quantity of times the SR is already sent. After a BWP is activated or deactivated, how to process an SR_COUNTER on the BWP that is maintained by a terminal is a problem that needs to be resolved.

Figure 19:
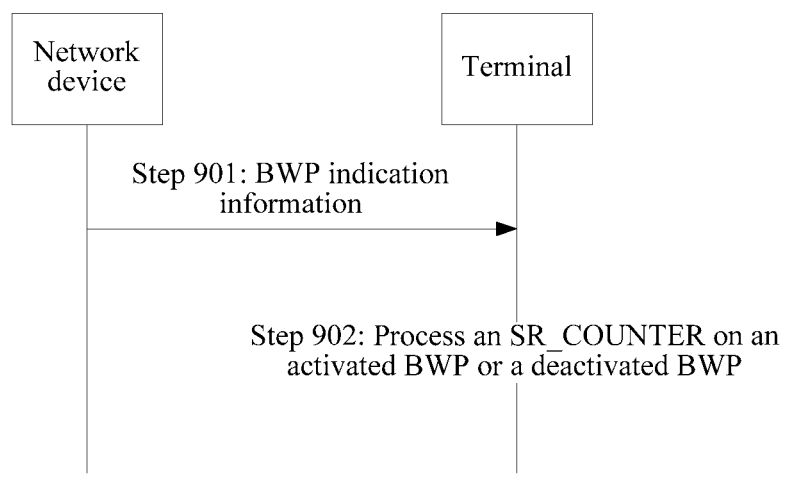
FIG. 19 is an interaction flowchart of a communication method according to yet another embodiment of this application.

FIG. 19 is an interaction flowchart of a communication method according to yet another embodiment of this application. The method mainly relates to an implementation process of processing an SR_COUNTER on a BWP after the BWP is activated or deactivated. As shown in FIG. 19, the method includes the following steps:

Step 901: A network device sends BWP indication information to a terminal.

The BWP indication information is used to instruct the terminal to activate a BWP and/or deactivate a BWP.

In this embodiment, for a type and a format of the BWP indication information, refer to the implementation of the BWP indication information in the embodiment shown in FIG. 2 to FIG. 7. Details are not described herein again.

Step 902: The terminal processes an SR_COUNTER on an activated BWP or a deactivated BWP.

In an implementation of step 902, a physical layer instructs a MAC layer to initialize the SR_COUNTER.

In this embodiment, after receiving the BWP indication information, the physical layer instructs the MAC layer to perform initialization or stop using an SR_COUNTER configured for a current SR and start to use an SR_COUNTER configured for a new SR. In this embodiment, the terminal configures and maintains a separate SR_COUNTER for each SR. When an SR configuration changes with a BWP, for example, the base station configures different SR configurations on different BWPs, and when BWP activation, deactivation, or switching is performed, using of an SR configuration on a deactivated BWP is stopped, and the terminal starts to use an SR configuration on an activated BWP. Therefore, the terminal stops using an SR_COUNTER corresponding to the SR configuration on the deactivated BWP, and starts to use an SR_COUNTER corresponding to the SR configuration on the activated BWP. Because the SR configuration on the activated BWP starts to be used, the SR_COUNTER of the SR configuration on the activated BWP may be set to an initial value. Therefore, this may alternatively be represented as that the physical layer instructs the MAC layer to initialize the SR_COUNTER. Before notifying the MAC layer, the physical layer may determine whether the MAC layer needs to be notified of a change of the SR configuration. For example, the physical layer may determine whether the SR configuration changes with the BWP activation or deactivation. If the SR configuration changes, the physical layer instructs the MAC layer to stop using, start to use, or initialize the SR_COUNTER. If the SR configuration does not change, the physical layer may alternatively not notify the MAC layer, or notify the MAC layer that the SR_COUNTER remains unchanged. For another example, the base station preconfigures an association relationship between SR configurations on BWPs. If the physical layer finds that the SR configuration changes, but there is an association relationship between changed SR configurations, the physical layer does not notify the MAC layer, or instructs the MAC layer to maintain the SR_COUNTER.

After the physical layer notifies the MAC layer, the MAC may further determine whether to stop using, start to use, or initialize the SR_COUNTER. For example, the base station preconfigures the association relationship between the SR configurations on the BWPs. If the MAC layer finds that there is an association relationship between SR configurations, although the physical layer instructs the MAC layer to stop using, start to use, or initialize the SR_COUNTER, the MAC layer may not stop using, start to use, or initialize the SR_COUNTER.

Figure 20:
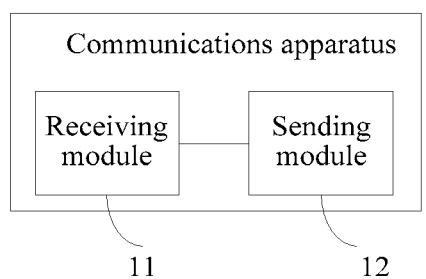
FIG. 20 is a block diagram of a communications apparatus according to an embodiment of this application.

FIG. 20 is a block diagram of a communications apparatus according to an embodiment of this application. As shown in FIG. 20, the apparatus includes a receiving module 11 and a sending module 12.

The receiving module 11 is configured to receive BWP indication information sent by a network device. The BWP indication information is used to instruct a terminal to activate a BWP and/or deactivate a BWP.

The sending module 12 is configured to send BWP feedback information to a base station. The BWP feedback information is used to indicate that the terminal successfully receives the BWP indication information.

For an implementation principle, beneficial effects, and possible implementations of the apparatus provided in this embodiment, refer to the method embodiment shown in FIG. 2 to FIG. 7. Details are not described herein again.

Figure 21:
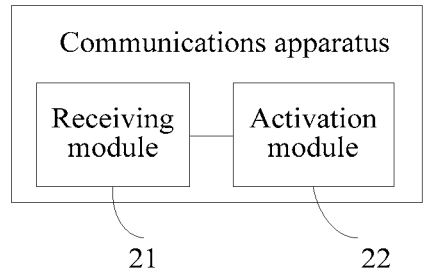
FIG. 21 is a block diagram of a communications apparatus according to another embodiment of this application.

FIG. 21 is a block diagram of a communications apparatus according to another embodiment of this application. As shown in FIG. 21, the apparatus includes a receiving module 21 and an activation module 22.

The receiving module 21 is configured to receive a BWP configuration message sent by a network device. The configuration message is used to configure a semi-persistent scheduling SPS resource of a BWP.

The receiving module 21 is further configured to receive first BWP indication information sent by the network device. The first BWP indication information is used to instruct a terminal to activate a first BWP.

The activation module 22 is configured to activate an SPS resource on the first BWP.

For an implementation principle, beneficial effects, and possible implementations of the apparatus provided in this embodiment, refer to the method embodiments shown in FIG. 8 to FIG. 12. Details are not described herein again.

Figure 22:
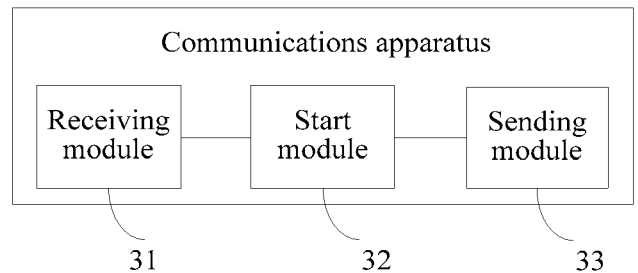
FIG. 22 is a block diagram of a communications apparatus according to another embodiment of this application.

FIG. 22 is a block diagram of a communications apparatus according to another embodiment of this application. As shown in FIG. 22, the apparatus includes a receiving module 31, a start module 32, and a sending module 33.

The receiving module 31 is configured to receive a configuration message sent by a network device. The configuration message is used to indicate duration of a timer.

The start module 32 is configured to start the timer when the receiving module 31 receives BWP indication information. The BWP indication information is used to instruct a terminal to activate a BWP or deactivate a BWP.

The sending module 33 is configured to report a power headroom report when the timer expires and a power headroom reporting condition is satisfied.

For an implementation principle, beneficial effects, and possible implementations of the apparatus provided in this embodiment, refer to the method embodiment shown in FIG. 13 and FIG. 14. Details are not described herein again.

Another embodiment of this application further provides a communications apparatus. A structure of the apparatus is the same as the structure of the apparatus shown in FIG. 20. The apparatus includes a receiving module 11 and a sending module 12.

The sending module 12 is configured to send BWP indication information to a terminal. The BWP indication information is used to instruct the terminal to activate a BWP and/or deactivate a BWP.

The receiving module 11 is configured to receive BWP feedback information sent by the terminal. The BWP feedback information is used to indicate that the terminal successfully receives the BWP indication information.

For an implementation principle, beneficial effects, and possible implementations of the apparatus provided in this embodiment, refer to the method embodiment shown in FIG. 2 to FIG. 7. Details are not described herein again.

Figure 23:
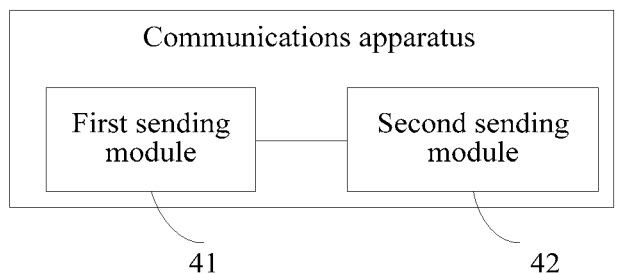
FIG. 23 is a block diagram of a communications apparatus according to another embodiment of this application.

FIG. 23 is a block diagram of a communications apparatus according to another embodiment of this application. As shown in FIG. 23, the apparatus includes a first sending module 41 and a second sending module 42.

The first sending module 41 is configured to send a BWP configuration message to a terminal. The configuration message is used to configure a semi-persistent scheduling SPS resource of a BWP.

The second sending module 42 is configured to send first BWP indication information to the terminal. The first BWP indication information is used to instruct the terminal to activate a first BWP.

For an implementation principle, beneficial effects, and possible implementations of the apparatus provided in this embodiment, refer to the method embodiments shown in FIG. 8 to FIG. 14. Details are not described herein again.

An embodiment of this application further provides a communications apparatus. A structure of the apparatus is the same as the structure of the apparatus shown in FIG. 20. The apparatus includes a receiving module 11 and a sending module 12.

The sending module 12 is configured to send a configuration message to a terminal. The configuration message is used to indicate duration of a timer.

The sending module 12 is further configured to send BWP indication information to the terminal, so that the terminal starts the timer. The BWP indication information is used to instruct the terminal to activate a BWP or deactivate a BWP.

The receiving module 11 is configured to receive a power headroom report reported by the terminal. The power headroom report is a report sent by the terminal when the timer expires and a power headroom reporting condition is satisfied.

For an implementation principle, beneficial effects, and possible implementations of the apparatus provided in this embodiment, refer to the method embodiment shown in FIG. 13 and FIG. 14. Details are not described herein again.

Figure 24:
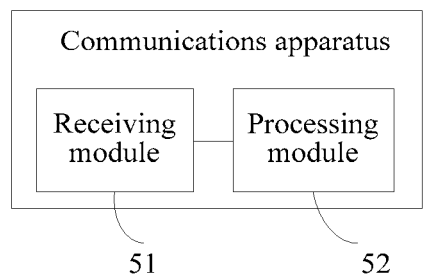
FIG. 24 is a block diagram of a communications apparatus according to another embodiment of this application.

FIG. 24 is a block diagram of a communications apparatus according to another embodiment of this application. As shown in FIG. 24, the apparatus includes a receiving module 51 and a processing module 52.

The receiving module 51 is configured to receive BWP indication information sent by a network device. The BWP indication information is used to instruct a terminal to activate a BWP and/or deactivate a BWP.

The processing module 52 is configured to process a HARQ process on the activated BWP or the deactivated BWP.

For an implementation principle, beneficial effects, and possible implementations of the apparatus provided in this embodiment, refer to the method embodiment shown in FIG. 15. Details are not described herein again.

An embodiment of this application further provides a communications apparatus. A structure of the apparatus is the same as the structure of the apparatus shown in FIG. 21. The apparatus includes a receiving module 21 and an activation module 22.

The receiving module 21 is configured to receive a BWP configuration message sent by a network device. The BWP configuration message is used to configure a CSI resource and/or an SRS resource of a BWP.

The receiving module 21 is further configured to receive first BWP indication information sent by the network device. The first BWP indication information is used to instruct a terminal to activate a first BWP.

The activation module 22 is configured to activate a CSI resource and/or an SRS resource on the first BWP.

For an implementation principle, beneficial effects, and possible implementations of the apparatus provided in this embodiment, refer to the method embodiments shown in FIG. 16 to FIG. 18. Details are not described herein again.

An embodiment of this application further provides a communications apparatus. A structure of the apparatus is the same as the structure shown in FIG. 24. The apparatus includes a receiving module 51 and a processing module 52.

The receiving module 51 is configured to receive BWP indication information sent by a network device. The BWP indication information is used to instruct a terminal to activate a BWP and/or deactivate a BWP.

The processing module 52 is configured to process an SR_COUNTER on the activated BWP or the deactivated BWP.

For an implementation principle, beneficial effects, and possible implementations of the apparatus provided in this embodiment, refer to the method embodiment shown in FIG. 19. Details are not described herein again.

An embodiment of this application further provides a communications apparatus, including a sending module. The sending module is configured to send BWP indication information to a terminal, so that the terminal processes a HARQ process on an activated BWP or a deactivated BWP after receiving the BWP indication information. The BWP indication information is used to instruct the terminal to activate a BWP and/or deactivate a BWP.

For an implementation principle, beneficial effects, and possible implementations of the apparatus provided in this embodiment, refer to the method embodiment shown in FIG. 15. Details are not described herein again.

An embodiment of this application further provides a communications apparatus. A structure of the apparatus is the same as the structure shown in FIG. 23. The apparatus includes a first sending module 41 and a second sending module 42.

The first sending module 41 is configured to send a BWP configuration message to a terminal. The BWP configuration message is used to configure a CSI resource and/or an SRS resource of a BWP.

The second sending module 42 is configured to send first BWP indication information to the terminal. The first BWP indication information is used to instruct the terminal to activate a first BWP.

For an implementation principle, beneficial effects, and possible implementations of the apparatus provided in this embodiment, refer to the method embodiments shown in FIG. 16 to FIG. 18. Details are not described herein again.

An embodiment of this application further provides an apparatus. The apparatus includes a sending module, configured to send BWP indication information to a terminal, so that the terminal processes an SR_COUNTER on an activated BWP or a deactivated BWP after receiving the BWP indication information. The BWP indication information is used to instruct the terminal to activate a BWP and/or deactivate a BWP.

For an implementation principle, beneficial effects, and possible implementations of the apparatus provided in this embodiment, refer to the method embodiment shown in FIG. 19. Details are not described herein again.

An embodiment of this application further provides a communications apparatus, including units and means configured to perform the steps in any one of the embodiments in FIG. 2 to FIG. 19.

An embodiment of this application further provides a communications apparatus, including a processor and a memory. The memory is configured to store a program. When being invoked by the processor, the program is used to perform the method in any one of the embodiments in FIG. 2 to FIG. 19.

An embodiment of this application further provides a computer storage medium. The computer storage medium stores a program. When being invoked by a processor, the program is used to implement the method in any one of the embodiments in FIG. 2 to FIG. 19.

It should be understood that division of the modules or the units of the foregoing communications apparatus is merely division of logical functions. In actual implementation, all or some of the modules or units may be integrated into a physical entity, or may be physically separated. In addition, all of the modules or units may be implemented in a form of software invoked by a processing element or in a form of hardware, or some of the modules or units may be implemented in a form of software invoked by a processing element, and some of the modules or units may be implemented in a form of hardware. For example, the processing module may be an independently disposed processing element, or may be integrated into a chip of a network device or a terminal for implementation. Alternatively, the processing module may be stored in a memory of a network device or a terminal in a form of a program, and a processing element of the network device or the terminal invokes and executes functions of the foregoing units. Implementations of other modules or units are similar to the implementation of the processing module. In addition, all or some of the modules or the units may be integrated, or may be separately implemented. The processing element may be an integrated circuit and has a signal processing capability. In an implementation process, the steps in the foregoing methods or the foregoing modules or units may be implemented by using an integrated logical circuit of hardware in the processing element, or by using an instruction in a form of software.

For example, the modules or units may be one or more integrated circuits configured to implement the foregoing method, for example, one or more application-specific integrated circuits (ASIC), one or more microprocessors (DSP), or one or more field programmable gate arrays (FPGA). For another example, when one of the foregoing modules or units is implemented by scheduling a program by a processing element, the processing element may be a general purpose processor, for example, a central processing unit (CPU) or another processor that can invoke the program. For still another example, these modules or units may be integrated together and implemented in a form of a system-on-a-chip (SOC).

Figure 25:
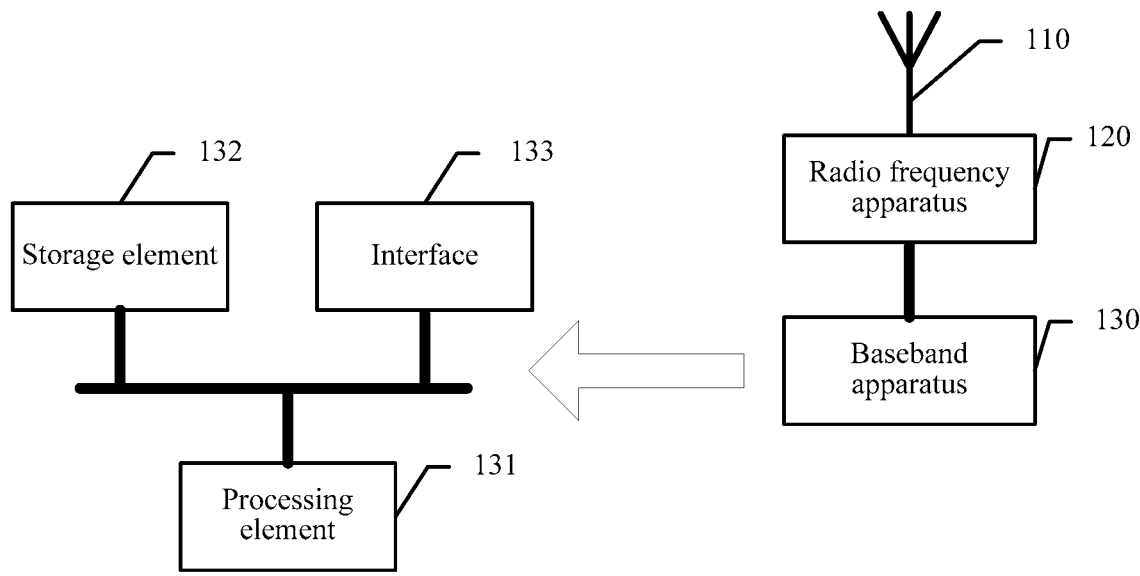
FIG. 25 is a schematic structural diagram of a network device according to an embodiment of this application.

FIG. 25 is a schematic structural diagram of a radio access network (RAN) node according to an embodiment of this application. The RAN node may be the network device in the foregoing embodiments, and is configured to implement the operations of the network device in the foregoing embodiments. As shown in FIG. 25, the RAN node includes: an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal, and sends, to the baseband apparatus 130 for processing, the information sent by the terminal. In a downlink direction, the baseband apparatus 130 processes information for the terminal, and sends the information to the radio frequency apparatus 120. The radio frequency apparatus 120 processes the information for the terminal, and then sends the information to the terminal through the antenna 110.

The baseband apparatus 130 may be a physical apparatus, or may include at least two apparatuses that are physically separated, for example, include a control unit (CU) and at least one DU. The DU and the radio frequency apparatus 120 may be integrated into an apparatus, or may be physically separated. Division of protocol layers at the at least two apparatuses that are physically separated in the baseband apparatus 130 is not limited. For example, the baseband apparatus 130 is configured to perform processing of protocol layers such as RRC, PDCP, RLC, MAC, and a physical layer. Division may be performed between any two protocol layers, so that the baseband apparatus includes two apparatuses that are physically separated and that are respectively configured to perform processing of protocol layers that the two apparatuses are respectively responsible for. For example, division is performed between the RRC and the PDCP. For another example, division may be performed between the PDCP and the RLC. Alternatively, division may be performed at a protocol layer. For example, a part of a protocol layer and a protocol layer above the protocol layer are assigned to an apparatus, and the remaining parts of the protocol layer and a protocol layer below the protocol layer are assigned to another apparatus. The communications apparatus may be located in one of the at least two apparatuses that are physically separated in the baseband apparatus 130).

The RAN node may include a plurality of baseband boards. A plurality of processing elements may be integrated on the baseband board to implement a required function. The baseband apparatus 130 may include at least one baseband board, and the communications apparatus may be located in the baseband apparatus 130. In an implementation, the modules or units shown in any one of the embodiments in FIG. 20 to FIG. 24 are implemented by scheduling a program by a processing element. For example, the baseband apparatus 130 includes a processing element 131 and a storage element 132. The processing element 131 invokes a program stored in the storage element 132, to perform the method performed by the RAN node in the foregoing method embodiments. In addition, the baseband apparatus 130 may further include an interface 133, configured to exchange information with the radio frequency apparatus 120. The interface is, for example, a common public radio interface (CPRI). When the baseband apparatus 130 and the radio frequency apparatus 120 are physically deployed together, the interface may be an inner-board interface or an inter-board interface. The board herein is a circuit board.

In another implementation, the modules or units shown in any one of the embodiments in FIG. 20 to FIG. 24 may be one or more processing elements configured to implement the method performed by the RAN node. The processing elements are disposed in the baseband apparatus 130. The processing element herein may be an integrated circuit, for example, one or more ASICs, one or more DSPs, or one or more FPGAs. The integrated circuits may be integrated together to form a chip.

For example, the modules or units shown in any one of the embodiments in FIG. 20 to FIG. 24 may be integrated together, and are implemented in a form of a system-on-a-chip (SOC). For example, the baseband apparatus 130 includes an SOC chip configured to implement the foregoing method. A processing element 131 and a storage element 132 may be integrated into the chip. The processing element 131 invokes a program stored in the storage element 132 to implement the method performed by the RAN node or functions of the modules or units shown in any one of the embodiments in FIG. 20 to FIG. 24. Alternatively, at least one integrated circuit may be integrated into the chip, to implement the method performed by the RAN node or the functions of the modules or units shown in any one of the embodiments in FIG. 20 to FIG. 24. Alternatively, with reference to the foregoing implementations, functions of some modules or units may be implemented by invoking a program by a processing element, and functions of some units may be implemented in a form of an integrated circuit.

In any manner, in conclusion, the foregoing communications apparatus applied to the RAN node includes at least one processing element and storage element. The at least one processing element is configured to perform the method that is performed by the RAN node and that is provided in the foregoing method embodiments. The processing element may perform, in a first manner, namely, in a manner of executing a program stored in the storage element, some or all steps performed by the RAN node in the foregoing method embodiment; or may perform, in a second manner, namely, in a manner of combining an integrated logical circuit of hardware in the processing element with an instruction, some or all steps performed by the RAN node in the foregoing method embodiment: or may certainly perform, by combining the first manner and the second manner, some or all steps performed by the RAN node in the foregoing method embodiment.

Similar to the foregoing description, the processing element herein may be a general purpose processor such as a central processing unit (CPU), or may be one or more integrated circuits configured to implement the foregoing method, for example, one or more application-specific integrated circuits (ASIC), one or more microprocessors (DSP), or one or more field programmable gate arrays (FPGA).

The storage element may be a memory, or may be a general term of a plurality of storage elements.

Figure 26:
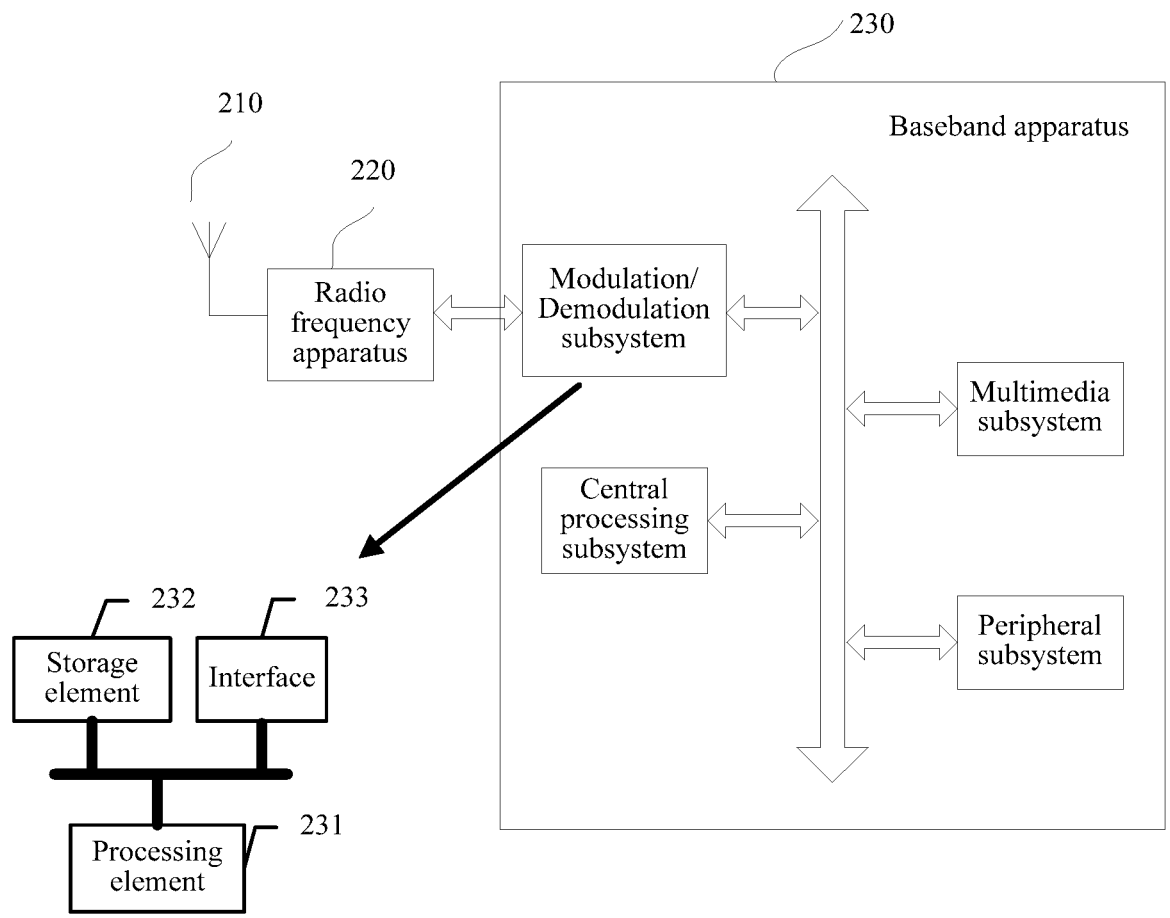
FIG. 26 is a schematic structural diagram of a terminal according to an embodiment of this application.

FIG. 26 is a schematic structural diagram of a terminal according to an embodiment of this application. The terminal may be the terminal in the foregoing embodiments, and is configured to implement the operations of the terminal in the foregoing embodiments. As shown in FIG. 26, the terminal includes an antenna 210, a radio frequency apparatus 220, and a baseband apparatus 230. The antenna 210 is connected to the radio frequency apparatus 220. In a downlink direction, the radio frequency apparatus 220 receives, through the antenna 210, information sent by a RAN node, and sends, to the baseband apparatus 230 for processing, the information sent by the RAN node. In an uplink direction, the baseband apparatus 230 processes information of the terminal, and sends the information to the radio frequency apparatus 220. The radio frequency apparatus 220 processes the information of the terminal, and then sends the information to the RAN node through the antenna 210.

The baseband apparatus may include a modulation/demodulation subsystem, configured to implement data processing at each communications protocol layer, and may further include a central processing subsystem, configured to process an operating system and an application layer of the terminal. In addition, the baseband apparatus may further include other subsystems, for example, a multimedia subsystem and a peripheral subsystem. The multimedia subsystem is configured to implement control on a terminal camera, screen display, and the like. The peripheral subsystem is configured to implement a connection to another device. The modulation/demodulation subsystem may be an independently disposed chip. Optionally, the communications apparatus may be implemented in the modulation/demodulation subsystem.

In an implementation, the units shown in FIG. 26 are implemented by scheduling a program by a processing element. For example, a subsystem such as the modulation/demodulation subsystem of the baseband apparatus 230 includes a processing element 231 and a storage element 232. The processing element 231 invokes a program stored in the storage element 232, to perform the method performed by the terminal in the foregoing method embodiments. In addition, the baseband apparatus 230 may further include an interface 233, configured to exchange information with the radio frequency apparatus 220.

In another implementation, the units shown in FIG. 26 may be one or more processing elements configured to implement the method performed by the terminal. The processing elements are disposed in a subsystem such as the modulation/demodulation subsystem of the baseband apparatus 230. The processing element herein may be an integrated circuit, for example, one or more ASICs, one or more DSPs, or one or more FPGAs. The integrated circuits may be integrated together to form a chip.

For example, the units shown in FIG. 26 may be integrated together, and are implemented in a form of a system-on-a-chip (SOC). For example, the baseband apparatus 230 includes an SOC chip configured to implement the foregoing method. A processing element 231 and a storage element 232 may be integrated into the chip. The processing element 231 invokes a program stored in the storage element 232 to implement the method performed by the terminal or functions of the modules or units shown in any one of the embodiments in FIG. 20 to FIG. 24. Alternatively, at least one integrated circuit may be integrated into the chip, to implement the method performed by the terminal or functions of the modules or units shown in any one of the embodiments in FIG. 20 to FIG. 24. Alternatively, with reference to the foregoing implementations, functions of some units may be implemented by invoking a program by a processing element, and functions of some units may be implemented in a form of an integrated circuit.

In any manner, in conclusion, the foregoing communications apparatus applied to the terminal includes at least one processing element and storage element. The at least one processing element is configured to perform the method that is performed by the terminal and that is provided in the foregoing method embodiments. The processing element may perform, in a first manner, namely, in a manner of executing a program stored in the storage element, some or all steps performed by the terminal in the foregoing method embodiment; or may perform, in a second manner, namely, in a manner of combining an integrated logical circuit of hardware in the processing element with an instruction, some or all steps performed by the terminal in the foregoing method embodiment; or may certainly perform, by combining the first manner and the second manner, some or all steps performed by the terminal in the foregoing method embodiment.

Similar to the foregoing description, the processing element herein may be a general purpose processor such as a central processing unit (CPU), or may be one or more integrated circuits configured to implement the foregoing method, for example, one or more application-specific integrated circuits (ASIC), one or more microprocessors (DSP), or one or more field programmable gate arrays (FPGA).

The storage element may be a memory, or may be a general term of a plurality of storage elements.

What is claimed is:

1. A communication method comprising:
   receiving, from a network device, a bandwidth part (BWP) configuration message containing configuration information that is used to configure:
      at least one BWP, and
      a grant-free (GF) resource of each of the at least one BWP;
   receiving, from the network device, a first BWP indication information that indicates a terminal to activate a first BWP in the at least one BWP;
   activating, for the terminal in accordance with the first BWP indication information, the first BWP;
   activating, in response to the first BWP being activated, the GF resource on the first BWP without receiving, from the network device, any further GF resource activation signaling;
   sending, to the network device, a BWP feedback information that indicates the terminal successfully received the first BWP indication information;
   receiving a deactivation indication that is used to deactivate a carrier component; and
   determining that at least one BWP on the deactivated carrier component is not valid.

2. The method according to claim 1, wherein the BWP configuration message comprises a configuration for each one of the at least one BWP, wherein the configuration for each one of the at least one BWP comprises:
   a BWP identifier indicating the BWP, and
   a frequency domain resource information indicating a frequency domain location of the BWP.

3. A communication method comprising:
   receiving, from a network device, a bandwidth part (BWP) configuration message that is used to configure:
      at least one BWP, and
      a grant-free (GF) resource of each of the at least one BWP;
   receiving, from the network device, a first BWP indication information that indicates a terminal to deactivate a first BWP in the at least one BWP;
   releasing, for the terminal in accordance with the first BWP indication information, the first BWP;
   releasing, in response to the first BWP being released, the GF resource on the first BWP without receiving, from the network device, any further GF resource activation signaling;
   sending, to the network device, a BWP feedback information that indicates the terminal successfully received the first BWP indication information;
   receiving a deactivation indication that is used to deactivate a carrier component; and
   determining that at least one BWP on the deactivated carrier component is not valid.

4. The method according to claim 3, wherein the BWP configuration message comprises a configuration for each one of the at least one BWP, wherein configuration for each one of the at least one BWP comprises:

a BWP identifier indicating the BWP, and
a frequency domain resource information indicating a frequency domain location of the BWP.

5. An apparatus comprising:
a processor, and
a memory having processor-executable instructions stored thereon, which when executed by the processor, cause the apparatus to carry out a communication method comprising:
receiving, from a network device, a bandwidth part (BWP) configuration message that is used to configure:
at least one BWP, and
a grant-free (GF) resource of each of the at least one BWP;
receiving, from the network device, a first BWP indication information that indicates to the apparatus to activate a first BWP in the at least one BWP;
activating, for the terminal in accordance with the first BWP indication information, the first BWP;
activating, in response to the first BWP being activated, the GF resource on the first BWP without receiving, from the network device, any further GF resource activation signaling;
sending, to the network device, a BWP feedback information that indicates the apparatus successfully received the first BWP indication information;
receiving a deactivation indication that is used to deactivate a carrier component; and
determining that at least one BWP on the deactivated carrier component is not valid.

6. The apparatus according to claim 5, wherein the instructions, when executed by the processor, further causes the device to carry out:
receiving a deactivation indication that is used to deactivate a carrier component; and
determining that at least one BWP on the inactive carrier component is not valid.

7. The apparatus according to claim 5, wherein the BWP configuration message comprises a configuration for each one of the at least one BWP, wherein configuration for each one of the at least one BWP comprises:
a BWP identifier indicating the BWP, and
a frequency domain resource information indicating a frequency domain location of the BWP.

8. An apparatus comprising:
a processor, and
a memory having processor-executable instructions stored thereon, which when executed by the processor, cause the device to carry out a method comprising:
receiving from a network device, a bandwidth part (BWP) configuration message that is used to configure:
at least one BWP, and
a grant-free (GF) resource of each of the at least one BWP;
receiving, from the network device, a first BWP indication information that indicates to the apparatus to deactivate a first BWP in the at least one BWP;
activating, for the terminal in accordance with the first BWP indication information, the first BWP;
releasing, in response to the first BWP being released, the GF resource on the first BWP without receiving, from the network device, any further GF resource activation signaling;
sending, to the network device, a BWP feedback information that indicates the apparatus successfully received the first BWP indication information;
receiving a deactivation indication that is used to deactivate a carrier component; and
determining that at least one BWP on the deactivated carrier component is not valid.

9. The apparatus according to claim 8, wherein the BWP configuration message comprises a configuration for each one of the at least one BWP, wherein configuration for each one of the at least one BWP comprises:
a BWP identifier indicating the BWP, and
a frequency domain resource information indicating a frequency domain location of the BWP.

10. The method of claim 1 wherein determining that at least one BWP on the inactive carrier component is not valid comprises:
determining that an active BWP on the inactive carrier component is not valid.

11. The method of claim 3 wherein determining that at least one BWP on the inactive carrier component is not valid, comprising:
determining that an active BWP on the inactive carrier component is not valid.

* * * * *

UNITED STATES PATENT AND TRADEMARK OFFICE
CERTIFICATE OF CORRECTION

PATENT NO. : 12,206,615 B2  
APPLICATION NO. : 16/833133  
DATED : January 21, 2025  
INVENTOR(S) : Lou et al.

Page 1 of 1

It is certified that error appears in the above-identified patent and that said Letters Patent is hereby corrected as shown below:

On the Title Page

Page 2: (56) References Cited, Other Publications, Right-Hand Column, Line 4 "Qingdao, China" should read as -- Qingdao, P.R. China --.

Page 2: (56) References Cited, Other Publications, Right-Hand Column, Line 21-22, "(April 13-17,1 2017)" should read as -- (April 13-17, 2017) --.

Signed and Sealed this  
Twenty-fourth Day of June, 2025

Coke Morgan Stewart  
*Acting Director of the United States Patent and Trademark Office*